(12) United States Patent
Arai

(10) Patent No.: US 11,445,082 B2
(45) Date of Patent: Sep. 13, 2022

(54) IMAGE FORMING APPARATUS INCORPORATING POSITION DETECTOR AND POSITION CORRECTOR

(71) Applicant: Daisuke Arai, Tokyo (JP)

(72) Inventor: Daisuke Arai, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 200 days.

(21) Appl. No.: 15/825,615

(22) Filed: Nov. 29, 2017

(65) Prior Publication Data
US 2018/0152576 A1 May 31, 2018

(30) Foreign Application Priority Data

Nov. 30, 2016 (JP) .............................. JP2016-233083
Sep. 5, 2017 (JP) .............................. JP2017-170171

(51) Int. Cl.
*H04N 1/00* (2006.01)
*G03G 15/00* (2006.01)
(Continued)

(52) U.S. Cl.
CPC ..... *H04N 1/00785* (2013.01); *G03G 15/6555* (2013.01); *G03G 15/6567* (2013.01);
(Continued)

(58) Field of Classification Search
CPC ........... G03G 15/6555; G03G 15/6558; G03G 15/6561; G03G 15/6567; G03G 15/5062;
(Continued)

(56) References Cited

U.S. PATENT DOCUMENTS 5,609,428 A * 3/1997 Tanaka .................... B41J 13/10
101/228
2002/0060417 A1 5/2002 Hiramitsu
(Continued)

FOREIGN PATENT DOCUMENTS

JP 6-234441 8/1994
JP 9-175694 7/1997
(Continued)

OTHER PUBLICATIONS

Japanese Patent Office Communication with Dispatch No. 564652 dated Jun. 17, 2021 for Japanese Patent Application No. 2017-170171.

*Primary Examiner* — Jennifer Bahls
*Assistant Examiner* — Quang X Nguyen
(74) *Attorney, Agent, or Firm* — Harness, Dickey & Pierce, P.L.C.

(57) ABSTRACT

An image forming apparatus includes an image forming device, a detector and a holding body. The image forming device is configured to perform an image formation to a sheet. The detector is configured to detect a position of a first image formed on a first surface of the sheet through the image formation of the image forming device. The holding body is configured to move while holding the sheet, by performing one of a rotation in a radial direction about a support shaft attached thereto in a direction perpendicular to an axial direction thereof and a lateral shift in a width direction of the sheet, operable to correct the position of the sheet based on a detection result obtained by the detector.

19 Claims, 18 Drawing Sheets

(51) Int. Cl.
*G03G 15/01* (2006.01)
*G03G 15/23* (2006.01)

(52) U.S. Cl.
CPC ..... *H04N 1/00702* (2013.01); *G03G 15/0121* (2013.01); *G03G 15/231* (2013.01)

(58) Field of Classification Search
CPC ..... G03G 2215/00561; H04N 1/00681; H04N 1/3878; H04N 1/00702; H04N 1/00785; H04N 1/00737
See application file for complete search history.

(56) References Cited

U.S. PATENT DOCUMENTS

| | | |
|---|---|---|
| 2005/0035528 A1 | 2/2005 | Suga et al. |
| 2005/0035536 A1 | 2/2005 | Suga et al. |
| 2005/0035539 A1 | 2/2005 | Hashimoto |
| 2006/0017214 A1* | 1/2006 | Inoue ................ B65H 9/006 |
| | | 271/10.12 |
| 2006/0267271 A1 | 11/2006 | Mandel et al. |
| 2006/0285903 A1 | 12/2006 | Yamane et al. |
| 2007/0153077 A1* | 7/2007 | Yamauchi .......... G03G 15/5062 |
| | | 347/116 |
| 2007/0264066 A1 | 11/2007 | Peng et al. |
| 2009/0033029 A1 | 2/2009 | Kinoshita et al. |
| 2011/0058872 A1 | 3/2011 | Ferrara et al. |
| 2012/0219343 A1 | 8/2012 | Ferrara et al. |
| 2012/0262513 A1* | 10/2012 | Mandel ............... B41J 11/0005 |
| | | 347/16 |
| 2014/0145397 A1 | 5/2014 | Aoki |
| 2015/0102555 A1 | 4/2015 | Deno |
| 2016/0159598 A1 | 6/2016 | Yamane et al. |
| 2017/0235269 A1* | 8/2017 | Deno ..................... B65H 7/10 |
| | | 271/225 |

FOREIGN PATENT DOCUMENTS

| | | |
|---|---|---|
| JP | 10-120253 | 5/1998 |
| JP | 2005-162384 | 6/2005 |
| JP | 2005-178929 | 7/2005 |
| JP | 2007-304504 A | 11/2007 |
| JP | 2010-115893 | 5/2010 |
| JP | 2010-137990 | 6/2010 |
| JP | 2010-149377 | 7/2010 |
| JP | 2011-098790 | 5/2011 |
| JP | 2014-088263 | 5/2014 |
| JP | 2014-193769 | 10/2014 |
| JP | 2015-000787 | 1/2015 |
| JP | 2016-010852 | 1/2016 |
| JP | 2016-044067 | 4/2016 |
| JP | 2016-088702 | 5/2016 |
| JP | 2016-108152 | 6/2016 |
| JP | 2016-175729 | 10/2016 |
| JP | 2016-175776 | 10/2016 |
| JP | 2016-178438 | 10/2016 |
| JP | 2016-179881 | 10/2016 |
| JP | 2016-188142 | 11/2016 |

* cited by examiner

IMAGE FORMING APPARATUS INCORPORATING POSITION DETECTOR AND POSITION CORRECTOR

CROSS-REFERENCE TO RELATED APPLICATIONS

This patent application is based on and claims priority pursuant to 35 U.S.C. § 119(a) to Japanese Patent Application Nos. 2016-233083, filed on Nov. 30, 2016, and 2017-170171, filed on Sep. 5, 2017, in the Japan Patent Office, the entire disclosure of each of which is hereby incorporated by reference herein.

BACKGROUND

Technical Field

This disclosure relates to an image forming apparatus that includes a position detector and a position corrector. Such image forming apparatus corresponds to a copier, printer, facsimile machine, and a multi-functional apparatus including at least two functions of the copier, printer, and facsimile machine.

Related Art

In known image forming apparatuses, there is a case that a sheet (recording medium) is conveyed off a correct position during sheet conveyance, that is, a sheet is shifted in a width direction or turned in an oblique direction. Due to the above-described deviations, a position of an image to be formed on the sheet is shifted from a desired position. Consequently, some known image forming apparatuses correct such a positional shift of the sheet in a process of conveyance of the sheet.

For example, a known image forming apparatus includes a detector such as a contact image sensor (ICS) and skew sensor is be disposed in a conveyance passage of a sheet, so that the detector detects an amount of lateral displacement of the sheet and angular displacement of the sheet. The known image forming apparatus further includes a pair of sheet holding rollers to hold the sheet between two rollers and convey the sheet toward a downstream side in a sheet conveying direction. When conveying the sheet, the pair of sheet holding rollers rotates or shifts in parallel in the width direction of the sheet based on the detection result of the detector, so that the positional error or the directional error of the sheet is corrected. After the correction of the positional error or the directional error, the sheet is conveyed toward an image transfer position at a downstream side of the sheet conveying direction.

In known image forming apparatuses, however, it is likely that an image formed on the sheet is off an ideal image forming position at an image transfer position, due to the positional or directional error of the image at the image transfer.

With such an image transfer position error, even if the sheet is conveyed while being located at an ideal position without any positional or directional error, the image forming position deviates. In a duplex printing, a positional error or a directional error occurs between an image formed on the front face of the sheet and another image formed on the back face of the sheet, due to this deviation of the image forming position.

SUMMARY

At least one aspect of this disclosure provides an image forming apparatus including an image forming device, a detector and a holding body. The image forming device is configured to perform an image formation to a sheet. The detector is configured to detect a position of a first image formed on a first surface of the sheet through the image formation of the image forming device. The holding body is configured to move while holding the sheet, by performing one of a rotation in a radial direction about a support shaft attached thereto in a direction perpendicular to an axial direction thereof and a lateral shift in a width direction of the sheet, operable to correct the position of the sheet based on a detection result obtained by the detector.

BRIEF DESCRIPTION OF THE SEVERAL VIEWS OF THE DRAWINGS

An exemplary embodiment of this disclosure will be described in detail based on the following figured, wherein.

DETAILED DESCRIPTION

Figure 1:
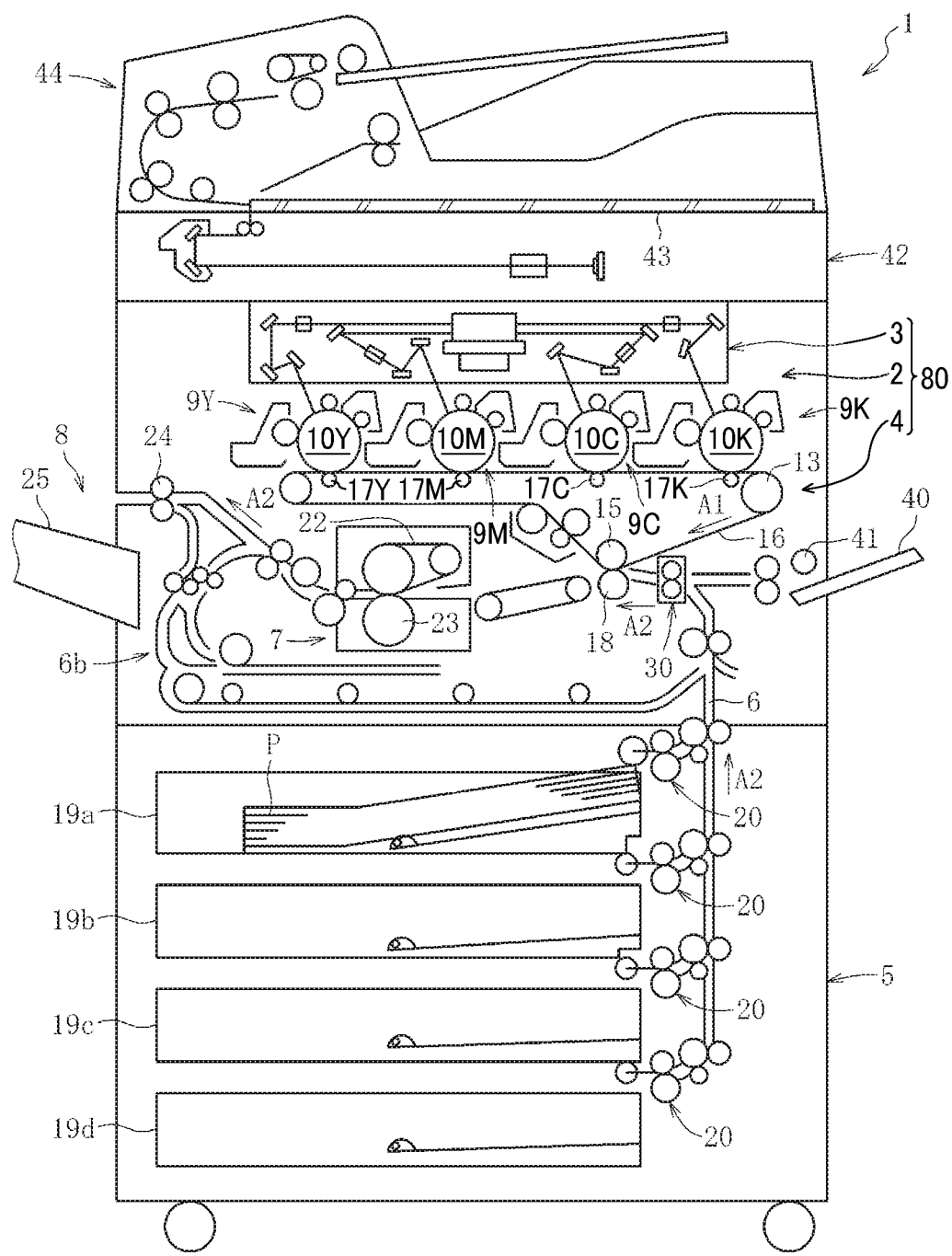
FIG. 1 is a diagram illustrating a schematic configuration of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Descriptions are given of an example applicable to a sheet conveying device and an image forming apparatus incorporating the sheet conveying device, with reference to the following figures. It is to be noted that identical parts are given identical reference numerals and redundant descriptions are summarized or omitted accordingly.

FIG. 1 is a diagram illustrating a schematic configuration of an image forming apparatus 1 according to an embodiment of this disclosure.

It is to be noted that identical parts are given identical reference numerals and redundant descriptions are summarized or omitted accordingly.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

As illustrated in FIG. 1, the image forming apparatus 1 includes an image forming portion 2 to which four process units 9Y, 9M, 9C and 9K are detachably attached. The process units 9Y, 9M, 9C and 9K have substantially the identical configurations to each other. Suffixes, which are Y, M, C and K, are used to indicate respective colors of (e.g., yellow, cyan, magenta, and black toners) for the process units 9Y, 9M, 9C and 9K. The process units 9Y, 9M, 9C and 9K are detachably attachable to developer used in the image forming apparatus 1 for image formation.

To be more specific, each of the process units 9Y, 9M, 9C and 9K includes a photoconductor drum 10 (i.e., photoconductor drums 10Y, 10M, 10C and 10K), a charging roller, and a developing device. The photoconductor drum 10 functions as a drum-shaped rotary body that bears toner as developer on a surface thereof. The charging roller uniformly charges the surface of the photoconductor drum 10. The developing device supplies toner on the surface of the photoconductor drum 10.

An exposure device 3 is disposed above the process unit 9 (i.e., the process units 9Y, 9M, 9C and 9K). The exposure device 3 emits laser light beams based on image data.

A transfer device 4 is disposed immediately below the image forming portion 2 that includes the process units 9Y, 9M, 9C and 9K. The transfer device 4 includes a drive roller 13, a secondary transfer opposing roller 15, multiple tension rollers, an intermediate transfer belt 16, and primary transfer rollers 17Y, 17M, 17C and 17K. The intermediate transfer belt 16 that has an endless loop is wound around the multiple tension rollers with tension, so that the intermediate transfer belt 16 moves along with rotations of the multiple tension rollers. The primary transfer roller 17 (i.e., the primary transfer rollers 17Y, 17M, 17C and 17K) is disposed facing the photoconductor drum 10 (i.e., the photoconductor drums 10Y, 10M, 10C and 10K) of the process unit 9 (i.e., the process units 9Y, 9M, 9C and 9K) with the intermediate transfer belt 16 interposed therebetween. At the respective positions, the primary transfer rollers 17Y, 17M, 17C and 17K are pressed against an inner circumferential surface (of the endless loop) of the intermediate transfer belt 16. Thus, respective primary transfer nip regions are formed at respective positions at which the photoconductor drums 10Y, 10M, 10C and 10K contact respective pressed portions of the intermediate transfer belt 16.

A secondary transfer roller 18 is disposed at a position opposing the secondary transfer opposing roller 15 with the intermediate transfer belt 16 interposed therebetween. The secondary transfer roller 18 presses an outer circumferential surface of the intermediate transfer belt 16. Thus, a secondary transfer nip region is formed at a position at which the secondary transfer roller 18 and the intermediate transfer belt 16 contact each other.

The image forming apparatus 1 further includes a sheet feeding device 5. The sheet feeding device 5 is disposed in a lower portion of the image forming apparatus 1 and includes sheet trays 19a, 19b, 19c and 19d and respective sheet feed rollers 20. Each of the sheet trays 19a, 19b, 19c and 19d functions as a sheet loader that loads sheets including a sheet P that functions as a recording medium. Each of the sheet feed rollers 20 picks up and feeds each sheet P from a corresponding one of the sheet trays 19a, 19b, 19c and 19d.

In addition to the sheet feeding device 5, a bypass tray 40 that also functions as a sheet loader is provided to one side of the image forming apparatus 1. Each sheet P loaded on the bypass tray 40 is fed into the image forming apparatus 1 by a bypass sheet feed roller 41.

The image forming apparatus 1 further includes a sheet conveyance passage 6 through which the sheet P fed from the sheet feeding device 5 is conveyed. The sheet conveyance passage 6 is defined by multiple pairs of sheet conveying rollers disposed up to a sheet output portion 8.

A sheet conveying device 30 is disposed downstream from the sheet feeding device 5 and upstream from the secondary transfer nip region in a sheet conveying direction indicated by arrow A2 in FIG. 1. The sheet conveying device 30 corrects lateral displacement and angular displacement of the sheet P in the sheet conveyance passage 6 before conveying the sheet P toward a downstream side of the sheet conveyance direction.

A fixing device 7 is disposed downstream from the secondary transfer nip region in the sheet conveying direction. The fixing device 7 includes a fixing belt 22 and a pressure roller 23. The fixing belt 22 is heated by a heater. The pressure roller 23 is disposed facing the fixing belt 22 to press against the fixing belt 22.

The sheet output portion 8 is disposed at an extreme downstream side of the sheet conveyance passage 6 of the image forming apparatus 1. The sheet output portion 8 includes a pair of sheet output rollers 24 and a sheet output tray 25. The pair of sheet output rollers 24 ejects the sheet P to the outside of an apparatus body of the image forming apparatus 1. The sheet output tray 25 is a tray on which sheets P output from the apparatus body of the image forming apparatus 1.

Different from an extreme downstream passage of the sheet conveyance passage 6, which corresponds to a passage of the sheet output portion 8, the image forming apparatus 1 includes a sheet reversal passage 6b that is branched from the pair of sheet output rollers 24. An end of the sheet reversal passage 6b meets and merges into the sheet conveyance passage 6 at a position upstream from the sheet conveying device 30 in the sheet conveyance passage 6. Multiple pairs of sheet conveying rollers are disposed along the sheet reversal passage 6b.

A scanner 42 is disposed at an upper part of the image forming apparatus 1. The scanner 42 scans an image formed on an original document that is loaded on an exposure glass 43.

An automatic document feeder (ADF) is disposed above the scanner 42. The ADF 44 automatically feed each original document loaded on a document loading table thereof.

Next, a description is given of a basic operation of the image forming apparatus 1 with reference to FIG. 1.

As the image forming apparatus 1 starts a series of image forming operations, an electrostatic latent image is formed on a surface of the photoconductor drum 10 (i.e., the photoconductor drums 10Y, 10M, 10C and 10K) of the process unit 9 (i.e., the process units 9Y, 9M, 9C and 9K).

It is to be noted that image data exposed to the surface of the photoconductor drum 10 by the exposure device 3 is single color image data of each color separated into each color information of yellow, magenta, cyan and black based on a desired full color image.

After an electrostatic latent image is formed on the surface of the photoconductor drum 10, toner stored in the developing device is supplied to the surface of the photoconductor drum 10 by a drum-shaped developing roller. Thus, the electrostatic latent image is developed into a visible toner image (a developed image).

In the transfer device 4, the intermediate transfer belt 16 moves along with rotation of the drive roller 13 in a direction indicated by arrow A1 in FIG. 1. A power supply provided to the image forming apparatus 1 applies a constant voltage or a constant current control voltage having a polarity opposite the polarity of the toner, to the primary transfer roller 17 (i.e., the primary transfer rollers 17Y, 17M, 17C and 17K), creating a transfer electric field at each primary transfer nip region formed between the photoconductor drum 10 and the primary transfer roller 11. As a result, a transfer electric field is formed at the primary transfer nip region. Toner images of respective colors on the photoconductor drums 10Y, 10M, 10C and 10K are transferred one after another onto the intermediate transfer belt 16 by the transfer electric fields formed at the respective primary transfer nip regions. As described above, the image forming portion 2, the exposure device 3 and the transfer device 4 function as an image forming device 80 that forms an image on a sheet P.

In addition, as the image forming operation starts, the sheet feed rollers 20 of the sheet feeding device 5 rotate at the lower part of the image forming apparatus 1, and therefore a sheet P that is loaded on one of the sheet trays 19a, 19b, 19c and 19d (for example, the sheet tray 19a) is fed to the sheet conveyance passage 6.

It is to be noted that a sheet P may be fed from the bypass tray 40 to the sheet conveyance passage 6.

After being fed to the sheet conveyance passage 6, the sheet P is conveyed toward the downstream side of the sheet conveying direction by the sheet conveying device 30 and the multiple pairs of sheet conveying rollers on the sheet conveyance passage 6. While the sheet P is being conveyed in the sheet conveyance passage 6, the lateral displacement and angular displacement of the sheet P are corrected by the sheet conveying device 30. Thereafter, the sheet P is conveyed to the secondary transfer nip region formed between the secondary transfer roller 18 and the secondary transfer opposing roller 15. At this time, a transfer voltage having a polarity opposite the toner polarity of the toner image formed on the intermediate transfer belt 16 is applied to the sheet P and the transfer electric field is generated in the secondary transfer nip region. Due to the transfer electric field generated in the secondary transfer nip region, the toner image formed on the intermediate transfer belt 16 is transferred onto the sheet P collectively.

Thereafter, the sheet P having the toner image thereon is conveyed to the fixing device 7, where the toner image is fixed to the sheet P by application of heat by the fixing belt 22 and pressure by the pressure roller 23. The sheet P having the fixed toner image thereon is separated form the fixing belt 22, is then conveyed by at least one of the multiple pairs of sheet conveying rollers disposed along the sheet conveyance passage 6, and is discharged to the sheet output tray 25 by the pair of sheet output rollers 24 in the sheet output portion 8.

The above description relates to a series of image forming operations for forming a full color image on a sheet P. In other image forming operations, a single color image can be formed by any one of the process units 9Y, 9M, 9C and 9K, or a composite color image of two or three colors can be formed by two or three of the process units 9Y, 9M, 9C and 9K.

Figure 2:
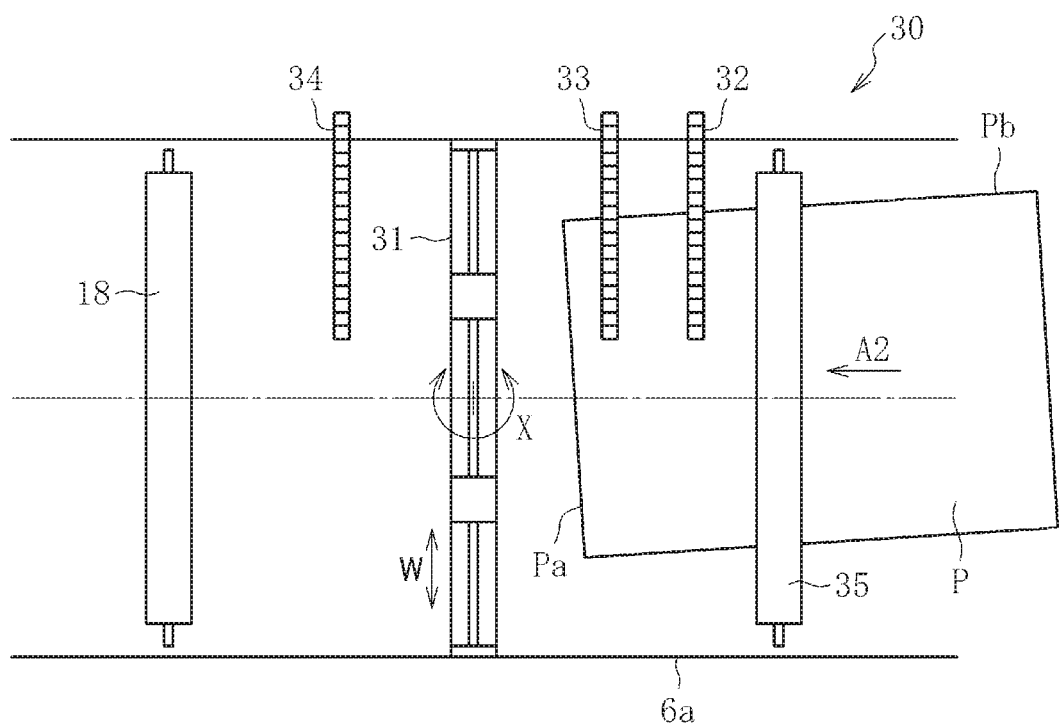
FIG. 2 is a diagram illustrating a schematic configuration of a sheet conveying device according to an embodiment of this disclosure.

Now, a detailed description is given of the sheet conveying device 30 with reference to FIG. 2. As described above, the sheet conveying device 30 conveys the sheet P toward the secondary transfer roller 18 disposed at the downstream side of the sheet conveying direction and at the same time corrects lateral displacement and angular displacement of the sheet P.

In a comparative image forming apparatus, however, when an image is transferred from a transfer member such as an intermediate transfer belt onto a sheet, it is likely that the image formed on the sheet is located off an ideal image forming position due to a positional deviation of the image, in other words, a directional error of the image during the image transfer.

When such a positional deviation of an image occurs, even if the sheet is conveyed for a transfer process to be located at an ideal transfer position without any positional or directional error, the image forming position is likely to be shifted from the ideal transfer position. Due to this positional deviation of the image, when a duplex printing in which respective images are formed on both sides of the sheet is performed, the positional deviation occurs between an image formed on a front face (i.e., a first face) of the sheet and another image formed on a back face (i.e., a second face) of the sheet.

In order to address the inconvenience of the comparative image forming apparatus, the sheet conveying device 30 according to the present embodiment has the following configuration.

As illustrated in FIG. 2, the sheet conveying device 30 according to the present embodiment includes a straight conveyance passage 6a that is part of the sheet conveyance passage 6 illustrated in FIG. 1. Along the straight conveyance passage 6a, a pair of sheet holding rollers 31 and position detectors, which are a first contact image sensor (CIS) 32, a second CIS 33 and a third CIS 34, are disposed.

The pair of sheet holding rollers 31 that functions as a sheet holding body holds the sheet P and conveys the sheet P toward the downstream side of the sheet conveying direction (i.e., the direction A2 in FIG. 2) and at the same time corrects an positional error and a directional error of the sheet P.

The first CIS 32, the second CIS 33 and the third CIS 34 are disposed in this order from the upstream side of the sheet conveying direction.

The pair of sheet holding rollers 31 is disposed downstream from the second CIS 33 and upstream from the third CIS 34 in the sheet conveying direction.

A pair of sheet conveying rollers 35 that conveys the sheet P is disposed upstream from the first CIS 32 in the sheet conveying direction.

Each CIS (that is, contact image sensor) includes multiple light emitting elements such as LEDs (that is, light emitting diodes) and multiple light receiving elements such as photodiodes. The multiple light emitting elements and the multiple light receiving elements are aligned in the width direction of the sheet P.

Next, a description is given of a configuration of a driving mechanism of the pair of sheet holding rollers 31 and parts provided near the pair of sheet holding rollers 31.

Figure 3:
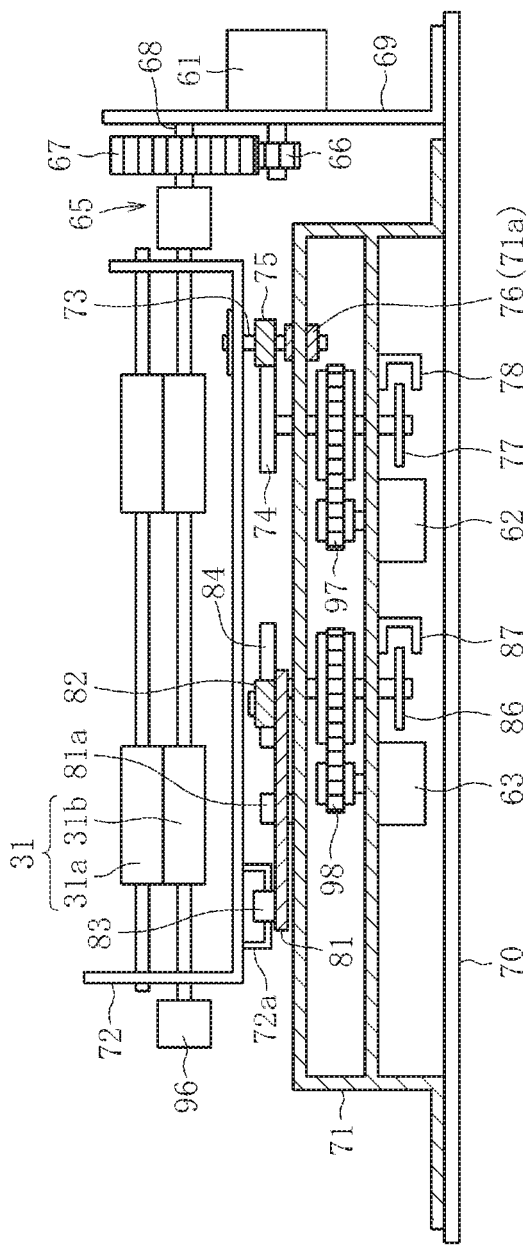
FIG. 3 is a cross sectional view illustrating a driving mechanism of a pair of sheet holding rollers.
Figure 4:
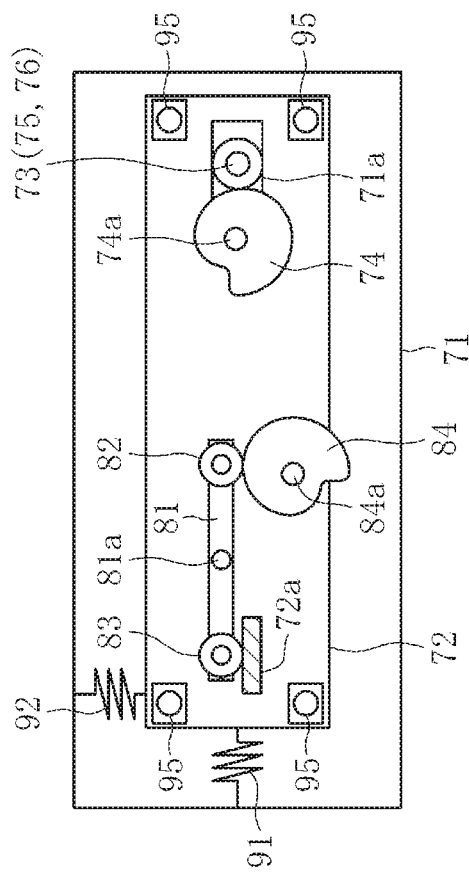
FIG. 4 is a cross sectional view illustrating a moving mechanism of a support frame.
Figure 5:
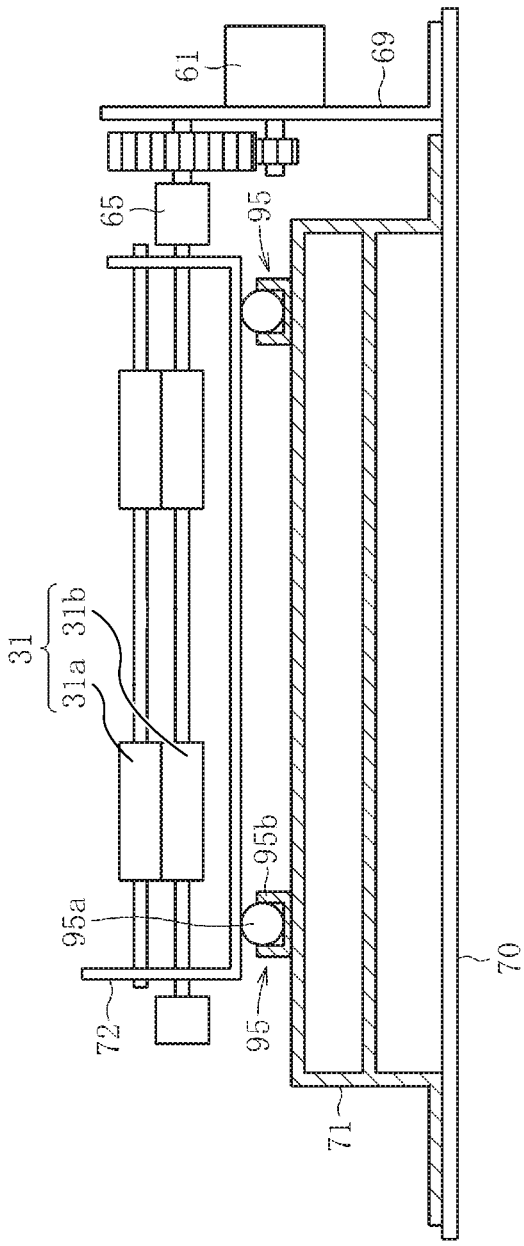
FIG. 5 is a cross sectional view illustrating another driving mechanism of the pair of sheet holding rollers.
Figure 6:
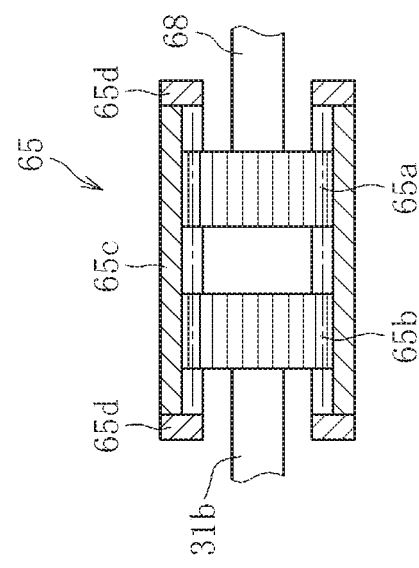
FIG. 6 is a cross sectional view illustrating a configuration of a two-step spline coupling.
Figure 7A:
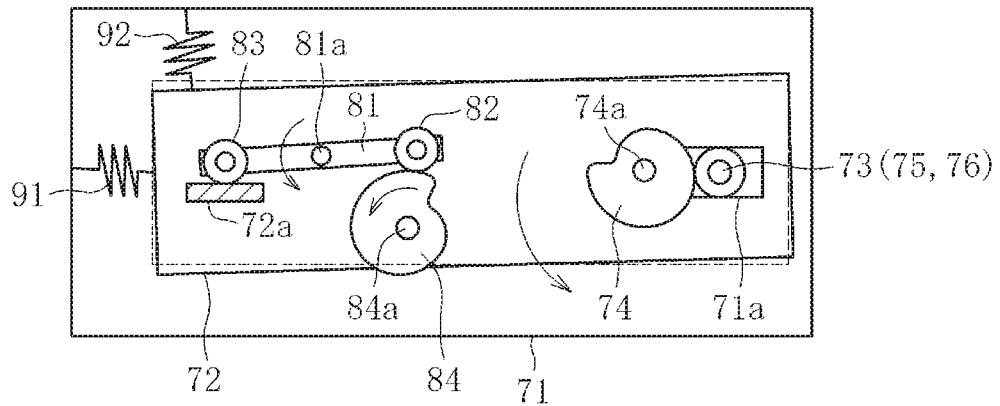
FIGS. 7A, 7B and 7C are diagrams illustrating movements of the support frame.
Figure 7B:
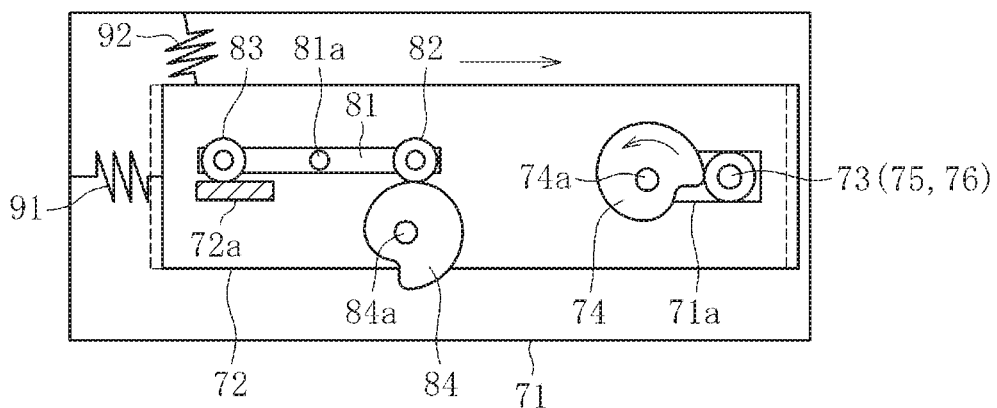
Figure 7C:
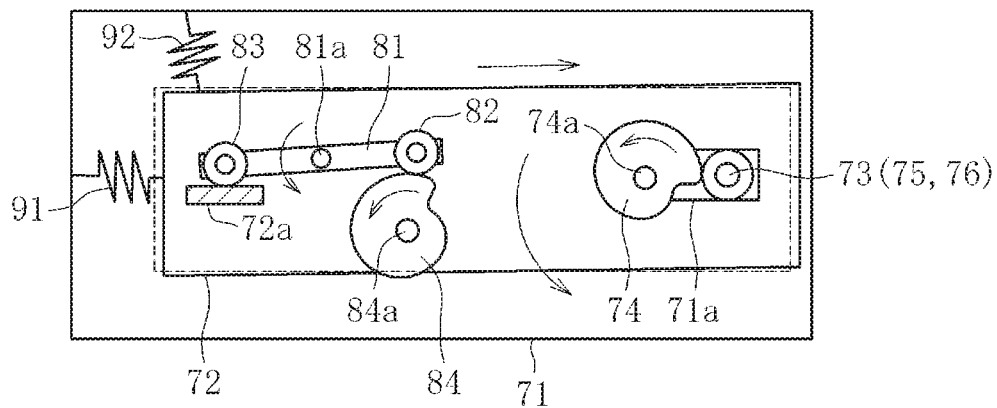

FIG. 3 is a cross sectional view illustrating the driving mechanism of the pair of sheet holding rollers 31. FIG. 4 is a cross sectional view illustrating a moving mechanism of a support frame 72. FIG. 5 is a cross sectional view illustrating another driving mechanism of the pair of sheet holding rollers 31. FIG. 6 is a cross sectional view illustrating a configuration of a two-step spline coupling 65. FIGS. 7A, 7B and 7C are diagrams illustrating movements of the support frame 72.

As illustrated in FIG. 3, the sheet conveying device 30 further includes a first motor 61 that functions as a first driver. The pair of sheet holding rollers 31 includes multiple pairs of rollers disposed spaced apart from each other in the width direction of the sheet P. Each of the multiple pairs of rollers of the pair of sheet holding rollers 31 includes a driven roller 31a and a drive roller 31b. The drive roller 31b is rotated by the first motor 61. The driven roller 31a is rotated with rotation of the drive roller 31b. The pair of sheet holding rollers 31 conveys the sheet P by rotating while holding the sheet P between the drive roller 31b and the driven roller 31a.

A body frame 70, a base frame 71 and a bracket 69 are relatively fixed by screw. The pair of sheet holding rollers 31 is rotatably supported by the support frame 72.

The pair of sheet holding rollers 31 moves together with the support frame 72 that functions as a support in two different directions, which are in a direction of rotation of the sheet P (i.e., in a direction indicated by bidirectional arrow X in FIG. 2) about a support shaft 73 and along the width direction of the sheet P (i.e., in a direction indicated by bidirectional arrow W in FIG. 2). With this configuration, the position and direction of the sheet P are corrected according to movement of the pair of sheet holding rollers 31 based on detection result of each CIS (i.e., the first CIS 32, the second CIS 33 and the third CIS 34). Specifically, the angular displacement of the sheet P (that is, a directional error relative to the sheet conveying direction) and the lateral displacement of the sheet P (that is, a positional error relative to the width direction of the sheet P) are corrected.

The support frame 72 is a box of metal plate and has openings formed at both ends in the width direction. Shafts of the pair of sheet holding rollers 31 are inserted into the respective openings of the support frame 72, via respective bearings. The support frame 72 moves together with the pair of sheet holding rollers 31. Specifically, the support frame 72 and the pair of sheet holding rollers 31 move together in the width direction of the body frame 70 and of the base frame 71 and rotate about the support shaft 73 of the support frame 72.

A first driving mechanism that includes a first motor 61 and a gear train including gears 66 and 67 is coupled to one end of the drive roller 31b in the width direction, via a two-step spline coupling 65. The first driving mechanism transmits a rotation driving force of the first motor 61 to the drive roller 31b via the gear train of the gears 66 and 67 and the two-step spline coupling 65, so as to drive and rotate the pair of sheet holding rollers 31.

An encoder 96 that controls a rotation speed and a rotation timing of the drive roller 31b (of the pair of sheet holding rollers 31) is mounted on the other end of the drive roller 31b in the width direction.

As illustrated in FIG. 6, the two-step spline coupling 65 includes a first spline gear 65a, a second spline gear 65b, an intermediate spline gear 65c and guide rings 65d.

The first spline gear 65a is an external gear and is mounted on a rotary shaft 68 that rotates together with the gear 67 of the gear train (including the gears 66 and 67) of the first driving mechanism. The rotary shaft 68 is rotatably held by the bracket 69 via a bearing. The second spline gear 65b is an external gear and is mounted on the shaft of the drive roller 31b.

The intermediate spline gear 65c is an internal gear and is extended in the width direction so that the intermediate spline gear 65c meshes with the first spline gear 65a and the second spline gear 65b even when the pair of sheet holding rollers 31 (attached to the support frame 72) shifts (slides) in the width direction. Each of the two spline gears 65a and 65b has a crown shape so that the two spline gears 65a and 65b mesh with the intermediate spline gear 65c even when the pair of sheet holding rollers 31 (attached to the support frame 72) rotates in a direction of rotation of the sheet P. By employing the above-described two-step spline coupling 65, even when the pair of sheet holding rollers 31 rotates about the support shaft 73 in a substantially horizontal direction or slidably moves in the width direction, the first motor 61 that is fixedly disposed to the bracket 69, the body frame 70 and the base frame 71 applies a driving force accurately to the drive roller 31b reliably, and the pair of sheet holding rollers 31 is rotates preferably.

Each of the guide rings 65d is a stopper having a substantially ring shape. The guide rings 65d are mounted at both ends of the intermediate spline gear 65c in the width direction, so as to prevent the two spline gears 65a and 65b from moving relatively in the width direction and resulting in falling from the two-step spline coupling 65.

As illustrated in FIG. 5, the support frame 72 is movably supported by the frames, i.e., the bracket 69, the body frame 70 and the base frame 71, via free bearings 95 (ball transfers). Each of the free bearings 95 functions as a relay support. According to this configuration, the support frame 72 is movable in any directions in the width direction of the sheet P and the direction of rotation of the sheet P, relative to the bracket 69, the body frame 70 and the base frame 71 (specifically, the base frame 71). In other words, the support frame 72 is supported to be movable on a plane perpendicular to the drawing sheet of FIG. 5.

Each of the free bearings 95 is known to include a steel ball 95a inserted into a recess portion of a base 95b. The top end of the steel ball 95a contacts a base surface of the support frame 72 as a point contact. The free bearings 95 are provided to support the support frame 72 at three points or more, with respect to the bracket 69, the body frame 70 and the base frame 71. In the present embodiment, as illustrated in FIG. 4, the free bearings 95 are fixed to the base frame 71 at respective positions of four corners on the base surface of the support frame 72 (i.e., respective positions at which the free bearings 95 can contact the support frame 72 even when the support frame 72 moves or rotates by the maximum movable distance).

By supporting the support frame 72 to the base frame 71 via the free bearings 95, even when the support frame 72 moves relative to the base frame 71 in a surface direction, a friction load generated due to the movement of the support frame 72 can be reduced to the minimum amount, and therefore correction of position of the sheet P (i.e., correction of angular displacement and correction of lateral displacement) can be performed with high responsiveness and high accuracy.

As illustrated in FIG. 3, the support shaft 73 (the stud) is fixed by caulking on the base surface of the support frame 72, at the side of the first driving mechanism (at the right side of FIG. 3) so that the support shaft 73 projects downwardly.

By contrast, a guide 71a that functions as a rectangular opening is formed in the ceiling of the base frame 71, at the side of the first driving mechanism.

As illustrated in FIGS. 3 and 4, the support shaft 73 is inserted into the guide 71a of the base frame 71 via a guide roller 76 that is rotatably attached to the support shaft 73. The support frame 72 and the pair of sheet holding rollers 31 slide together in the width direction of the sheet P along with movement of the support shaft 73 along the guide 71a or rotate together about the support shaft 73.

The pair of sheet holding rollers 31 further includes a second driving mechanism that causes the pair of sheet holding rollers 31 to rotate about the support shaft 73 and correct the angular displacement of the sheet P. As illustrated in FIG. 3, the second driving mechanism includes a second motor 63, a timing belt 98, a first cam 84, a first tension spring 92 (see FIG. 4) and a lever 81. The first tension spring 92 functions as a first biasing member.

As illustrated in FIG. 3, the second motor 63 is fixed to the base frame 71. The timing belt 98 is wound around a drive pulley mounted on a motor shaft of the second motor 63 and a driven pulley mounted on a rotary support shaft of the first cam 84. A driving force generated by the second motor 63 is transmitted to the first cam 84 via the timing belt 98.

As illustrated in FIG. 4, the first tension spring 92 is connected to the support frame 72 and the base frame 71 so as to bias the support frame 72 in a normal direction of rotation of the sheet P (i.e., a clockwise direction about the support shaft 73 of FIG. 4).

The lever 81 is held by the base frame 71 and rotatable about a rotary support shaft 81a. A cam follower 82 is rotatably mounted on (axially supported by) one end of the lever 81. The cam follower 82 that functions as a first rotary member contacts the first cam 84. A roller 83 is rotatably mounted on (axially supported by) the other end of the lever 81. The roller 83 that functions as a second rotary member contacts a projection 72a of the support frame 72.

The first cam 84 is held by the base frame 71 to be rotatable about the rotary support shaft 84a. The first cam 84 indirectly presses the support frame 72 that is biased by the first tension spring 92 toward the normal direction of rotation of the sheet P, in an opposite direction of rotation of the sheet P (i.e., in a counterclockwise direction about the support shaft 73 of FIG. 4), via the lever 81.

According to this configuration, as the second motor 63 starts, the rotation driving force generated by the second motor 63 is transmitted to the first cam 84 via the timing belt 98, so that the first cam 84 rotates in the counterclockwise direction, as illustrated in FIG. 7A. Due to the rotation force of the first cam 84, the lever 81 is pressed to rotate about the rotary support shaft 81a. Consequently, the support frame 72 is pressed by the lever 81 at the position where the projection 72a is formed, and therefore the support frame 72 rotates against the spring force of the first tension spring 92. With this turn (rotation) of the support frame 72, the pair of sheet holding rollers 31 rotates in a direction indicated by arrow X of FIG. 2 to correct the angular displacement of the sheet P.

It is to be noted that the first cam 84 and the cam follower 82 constantly in contact with each other due to the spring force of the first tension spring 92. Further, the projection 72a of the support frame 72 and the roller 83 constantly in contact with each other. An angle of rotation of the support frame 72 that rotates about the support shaft 73 (i.e., an attitude of the support frame 72 in the direction of rotation) is determined based on an angle of rotation of the first cam 84 (i.e., an attitude of the first cam 84 in the direction of rotation).

As described above, the pair of sheet holding rollers 31 includes the cam follower 82 disposed at a contact position where the first cam 84 and the lever 81 contact with each other, and the roller 83 disposed at a contact position where the projection 72a and the lever 81 contact with each other. With this configuration, a friction load generated at each of the contact positions can be extremely reduced, and therefore the correction of angular displacement (skew correction) of the sheet P can be performed with high responsiveness and high accuracy.

Further, as illustrated in FIG. 3, an encoder wheel 86 is mounted on the rotary support shaft 84a of the first cam 84 and an encoder sensor 87 is fixedly disposed on the base frame 71 at a position opposing the encoder wheel 86. Then, the second motor 63 is controlled based on a detection result of the encoder wheel 86 obtained by the encoder sensor 87, and the angle of rotation of the first cam 84 is adjusted. Consequently, an amount of rotation of the support frame 72 is adjusted.

The first cam 84 is manufactured to generate a motion curve having a constant velocity. According to this structure, the angle of rotation of the first cam 84 is controlled to have an amount of change in proportion to the angle of rotation of the support frame 72. Therefore, the correction of angular displacement of the sheet P is performed with high accuracy.

The pair of sheet holding rollers 31 further includes a third driving mechanism to move the pair of sheet holding rollers 31 in the width direction and correct the lateral displacement of the sheet P. As illustrated in FIG. 3, the third driving mechanism includes a third motor 62, a timing belt 97, a second cam 74 and a second tension spring 91 that functions as a second biasing member (see FIG. 4).

As illustrated in FIG. 3, the third motor 62 is fixed to the base frame 71. The timing belt 97 is wound around a drive pulley mounted on a motor shaft of the third motor 62 and a driven pulley mounted on a rotary support shaft 74a of the second cam 74. A driving force of the third motor 62 is transmitted to the second cam 74 via the timing belt 97.

As illustrated in FIG. 4, the second tension spring 91 is connected to the support frame 72 and the base frame 71 so as to bias the support frame 72 in a normal width direction of the sheet P (i.e., a left side direction of FIG. 4).

The second cam 74 is held by the base frame 71 to be rotatable about the rotary support shaft 74a. The second cam 74 presses the support frame 72 that is biased by the second tension spring 91 toward the normal width direction of the sheet P, in an opposite direction of the normal width direction of the sheet P (i.e., in a right side direction of FIG. 4). A cam follower 75 is mounted on (axially supported by) the support shaft 73 of the support frame 72, at a position at which the cam follower 75 contacts the second cam 74. The guide roller 76 is mounted (axially supported) at a position at which the support shaft 73 contacts the guide 71a.

According to this configuration, as the third motor 62 starts, the rotation driving force generated by the third motor 62 is transmitted to the second cam 74 via the timing belt 97, so that the second cam 74 rotates in the counterclockwise direction, as illustrated in FIG. 7B. Due to the rotation force of the second cam 74, the support frame 72 slides along the guide 71a, against the spring force of the second tension spring 91. Accordingly, the lateral displacement of the sheet P is corrected.

It is to be noted that the second cam 74 and the cam follower 75 constantly in contact with each other due to the spring force of the second tension spring 91. Further, a distance of movement of the support shaft 73 in the width direction of the sheet P is determined based on an angle of rotation of the second cam 74 (i.e., an attitude of the second cam 74 in the direction of rotation).

As described above, the pair of sheet holding rollers 31 includes the second cam 74 and the support shaft 73 in contact with each other via the cam follower 75. With this configuration, a friction load generated at the contact position can be extremely reduced, and therefore the correction of lateral displacement of the sheet P can be performed with high responsiveness and high accuracy.

Further, as illustrated in FIG. 3, an encoder wheel 77 is mounted on the rotary support shaft 74a of the second cam 74 and an encoder sensor 78 is fixedly disposed on the base frame 71 at a position opposing the encoder wheel 77. Then, the third motor 62 is controlled based on a detection result of the encoder wheel 77 obtained by the encoder sensor 78, and the angle of rotation of the second cam 74 is adjusted. Consequently, an amount of movement of the support frame 72 in the width direction of the sheet P is adjusted.

The second cam 74 is manufactured to generate a motion curve having a constant velocity. According to this structure, the angle of rotation of the second cam 74 is controlled to have an amount of change in proportion to the distance of movement of the support frame 72. Therefore, the correction of lateral displacement of the sheet P is performed with high accuracy.

FIG. 7C is a diagram illustrating an example of movement of the support frame 72 when the correction of sheet P and the correction of lateral displacement of the sheet P are performed simultaneously.

As illustrated in FIG. 7C, as the second motor 63 starts and the first cam 84 is rotated, the lever 81 is pressed by the first cam 84 to rotate about the rotary support shaft 81a. Then, the support frame 72 is pressed by the lever 81 at the position of the projection 72a, so that the support frame 72 rotates against the spring force of the first tension spring 92. At the same time, as the third motor 62 starts, the second cam 74 is rotated. Due to the rotation of the second cam 74, the support frame 72 slides against the spring force of the second tension spring 91. At this time, the roller 83 of the lever 81 presses the projection 72a (of the support frame 72) while moving on the surface of the projection 72a.

Figure 8:
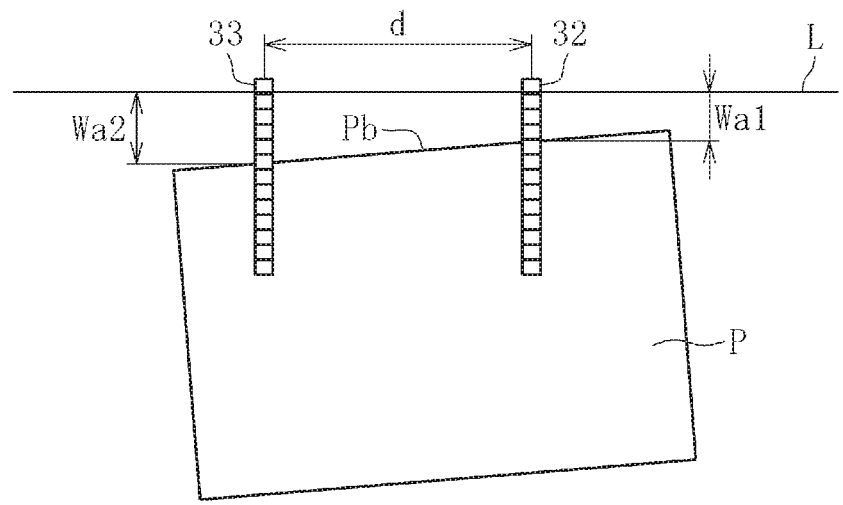
FIG. 8 is a diagram illustrating how to calculate an amount of lateral displacement and an amount of angular displacement of a sheet by each CIS.

Next, a description is given of a detection method of detecting the positional error of the sheet P with each CIS, with reference to FIG. 8.

As illustrated in FIG. 8, when the sheet P is conveyed to a position at which the sheet P is located facing or opposite the first CIS 32 and the second CIS 33, each of the first CIS 32 and the second CIS 33 read the position of a side end Pb of the sheet P. By calculating a distance between the position of the side end Pb of the sheet P and an ideal position L in the width direction of the sheet P (indicated by a solid line L in FIG. 8), an amount of lateral displacement of the sheet P can be obtained. For example, the amount of lateral displacement of the sheet P is expressed as an expression of (Wa1 (plus) Wa2)/2, where "Wa1" represents a distance from the parallel line L of the side end Pb at the position of the first CIS 32 and "Wa2" represents a distance from the parallel line L of the side end Pb at the position of the second CIS 33. In addition, an amount of angular displacement of the sheet P is obtained with an expression of (Wa1 (minus) Wa2)/d, where "d" represents a previously obtained distance between the first CIS 32 and the second CIS 33.

Accordingly, the amount of positional error of the sheet P and an amount of positional error of an image are detected by the first CIS 32 (i.e., an upstream side detector) and the second CIS 33 (i.e., a downstream side detector). Further, the amount of positional error of the sheet P and the amount of positional error of an image are detected by the second CIS 33 (i.e., an upstream side detector) and the third CIS 34 (i.e., a downstream side detector), by using the same method as above. In other words, in the present embodiment, the detectors, which are the upstream side detector and the downstream side detector, are disposed facing the sheet P. According to this configuration, the position of the sheet P and the position of an image can be detected.

A description is given of processes in which the sheet conveying device 30 corrects the positional error of the sheet P, based on the amount of positional error of the sheet P obtained as described above, while a printing operation is performed to the front surface (the first surface) of the sheet P, with reference to FIGS. 9A through 14B.

Figure 9A:
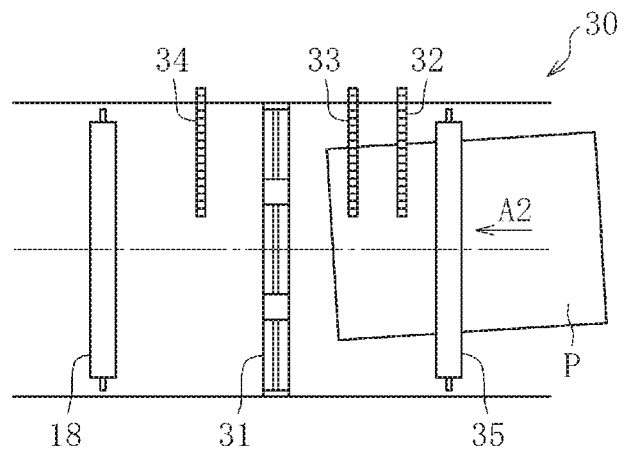
FIG. 9A is a plan view illustrating one step of a process of sheet conveyance and correction of a position of a sheet by the sheet conveying device when printing a front face of the sheet.
Figure 9B:
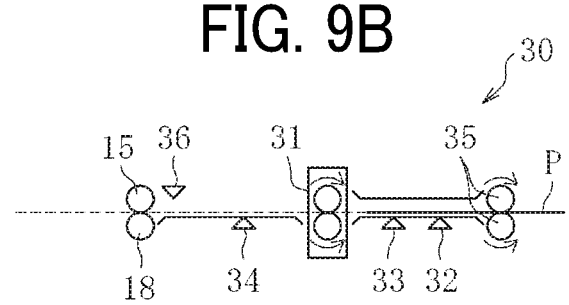
FIG. 9B is a side view illustrating the process of FIG. 9A.

As illustrated in FIGS. 9A and 9B, the sheet conveying device 30 corrects the position of the sheet P by the pair of sheet holding rollers 31 while conveying the sheet P toward the secondary transfer roller 18.

It is to be noted that a detection sensor 36 that detects arrival of the sheet P at the secondary transfer position (i.e., the image forming position to the sheet P) is disposed immediately before the secondary transfer nip region, as illustrated in FIG. 9B.

When the sheet P is conveyed to the sheet conveying device 30, the pair of sheet conveying rollers 35 holds the sheet P. As the leading end Pa of the sheet P reaches and passes each CIS (i.e., the first CIS 32, the second CIS 33 and the third CIS 34), the position of the sheet P in the width direction is detected to calculate the amount of lateral displacement of the sheet P.

After the sheet P is conveyed to a position opposite the first CIS 32 and the second CIS 33, the amount of angular displacement of the sheet P is calculated by the first CIS 32 and the second CIS 33 with the above-described method.

It is to be noted that an amount of positional deviation of the sheet P may be obtained by performing multiple detections and performing a statistical processing based on the detection result or by performing one detection and determining the detection result as the amount.

Figure 10A:
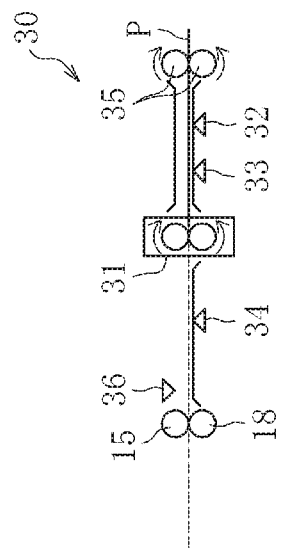
FIG. 10A is a diagram illustrating a subsequent step of the process of sheet conveyance and correction of the position of the sheet by the sheet conveying device when printing the front face of the sheet.
Figure 10B:
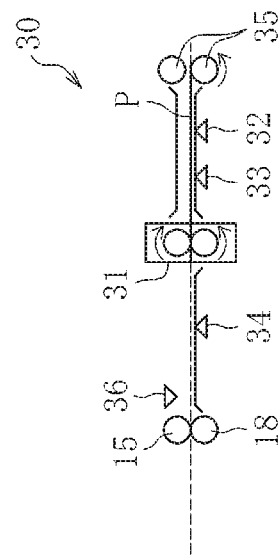
FIG. 10B is a side view illustrating the process of FIG. 10A.

As illustrated in FIGS. 10A and 10B, after the amount of positional deviation of the sheet P is calculated, the pair of sheet holding rollers 31 moves by the amount of positional deviation of the sheet P in a direction opposite the direction to previously correct the sheet P before holding the sheet P. Specifically, the pair of sheet holding rollers 31 rotates in a direction indicated by arrow X1 by an amount of angular displacement of the sheet P and, at the same time, slides in parallel in a direction indicated by arrow W1 by an amount of lateral displacement of the sheet P. Hereinafter, the above-described operation of the pair of sheet holding rollers 31 is referred to as a "pick up and hold operation."

The pair of sheet holding rollers 31 has a rotation center X0 at the center of the pair of sheet holding rollers 31 in the width direction and rotates based on a lateral center position of the sheet P. The pair of sheet holding rollers 31 rotates about the rotation center X0 while holding the sheet P, so that the pair of sheet holding rollers 31 corrects the angular displacement of the sheet P. Further, the pair of sheet holding rollers 31 slides in the width direction of the sheet P, so that the pair of sheet holding rollers 31 corrects the lateral displacement of the sheet P.

Figure 11A:
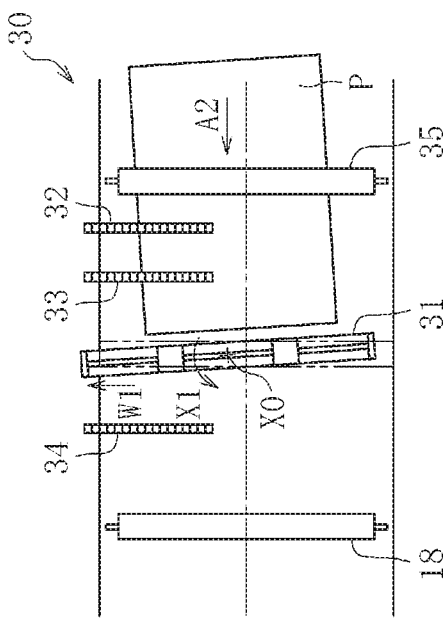
FIG. 11A is a diagram illustrating another subsequent step of the process of sheet conveyance and correction of the position of the sheet by the sheet conveying device when printing the front face of the sheet.
Figure 11B:
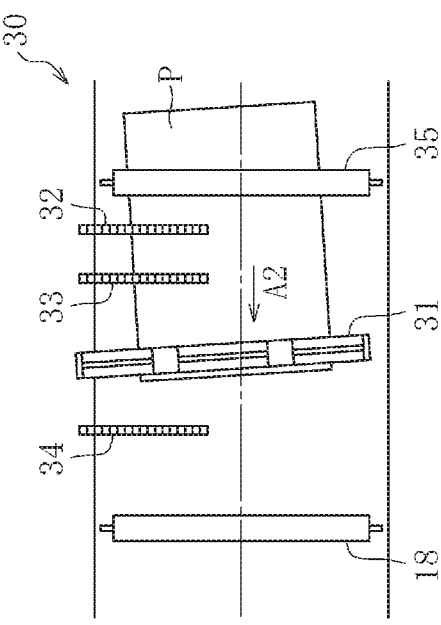
FIG. 11B is a side view illustrating the process of FIG. 11A.

As illustrated in FIGS. 11A and 11B, by performing the pick up and hold operation, the pair of sheet holding rollers 31 holds the sheet P while a longitudinal line of the pair of sheet holding rollers 31 is facing the front of the leading end of the sheet P. Accordingly, generation of the positional deviation of the sheet P can be extremely reduced when the pair of sheet holding rollers 31 holds the sheet P. After the pair of sheet holding rollers 31 holds the sheet P, the pair of sheet conveying rollers 35 separates from the sheet P.

Figure 12A:
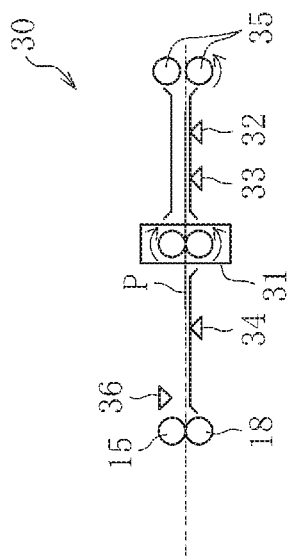
FIG. 12A is a diagram illustrating yet another subsequent step of the process of sheet conveyance and correction of the position by the sheet conveying device when printing the front face of the sheet.
Figure 12B:
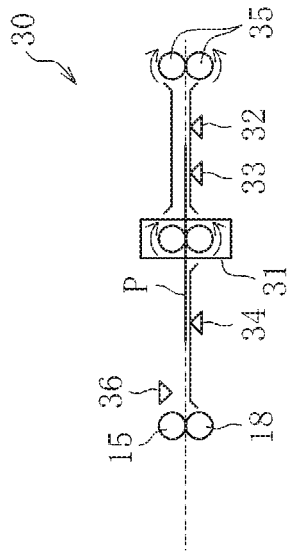
FIG. 12B is a side view illustrating the process of FIG. 12A.

As illustrated in FIGS. 12A and 12B, the pair of sheet holding rollers 31 that is holding the sheet P corrects the positional deviation of the sheet P while conveying the sheet P toward the downstream side of the sheet conveying direction. Specifically, while conveying the sheet P in a direction indicated by arrow A2, the pair of sheet holding rollers 31 rotates in a direction indicated by arrow X2 and slides in parallel to a direction indicated by arrow W2, based on the amount of positional deviation of the sheet P detected by each CIS (i.e., the first CIS 32, the second CIS 33 and the third CIS 34). Accordingly, the sheet P moves from the original position (i.e., the position indicated by a broken line in FIG. 12A) to the position after correction (i.e., the position indicated by a solid line in FIG. 12A), and therefore the positional deviation of the sheet P in the sheet conveyance passage is corrected. Hereinafter, the above-described operation is referred to as an "adjustment and feed operation."

At this time, by causing the pair of sheet holding rollers 31 to perform the adjustment and feed operation previously, the pair of sheet holding rollers 31 after the adjustment and feed operation can be located at a reference attitude of the pair of sheet holding rollers 31. The reference attitude is an attitude in which the longitudinal line of the pair of sheet holding rollers 31 is located facing the sheet conveyance passage through which the sheet P passes, as indicated by a solid line in FIG. 12A.

Figure 15:
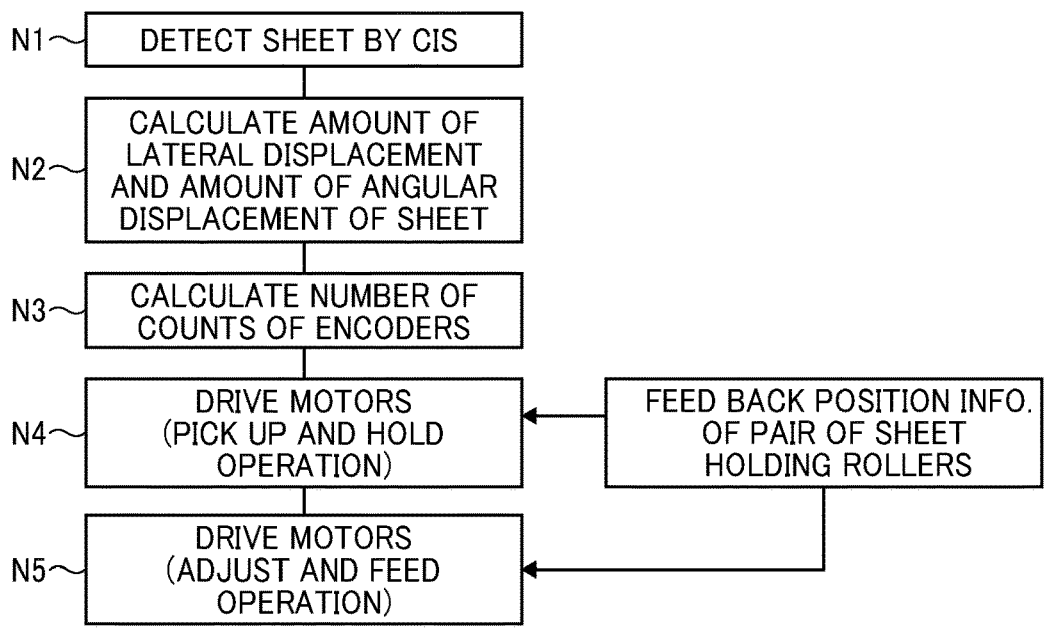
FIG. 15 is a flowchart of the processes of movement illustrated in FIGS. 9A through 12A.
Figure 16:
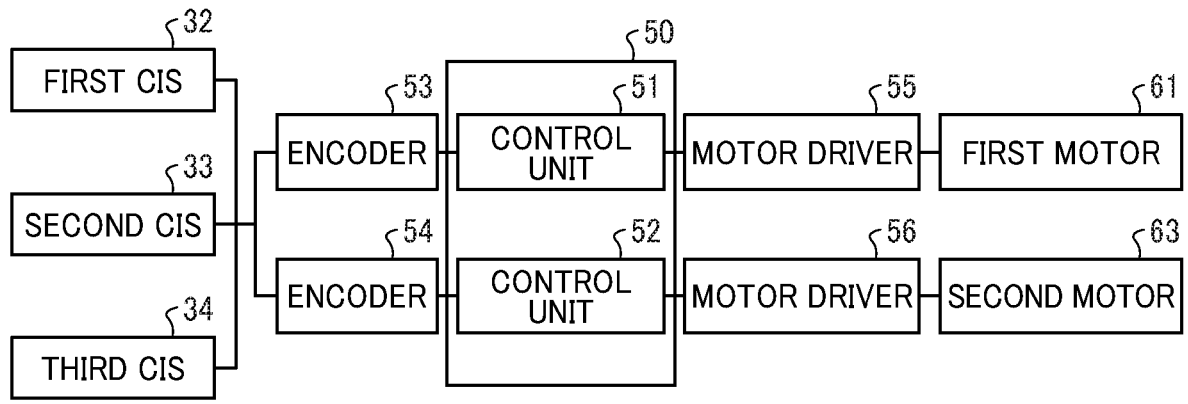
FIG. 16 is a block diagram illustrating a relation of each CIS motor and a controller.

FIG. 15 is a flowchart of control of the above-described operations. FIG. 16 is a block diagram illustrating a relation of respective motors to drive the CISs (i.e., the first CIS 32, the second CIS 33 and the third CIS 34) and the pair of sheet holding rollers 31 and a controller 50.

As illustrated in FIG. 15, the first CIS 32 and the second CIS 33 detect the sheet P, in step N1. Then, the amount of lateral displacement of the sheet P and the amount of angular displacement of the sheet P are calculated, in step N2. Based on the detected amounts, encoders 53 and 54 (see FIG. 16) calculates the number of counts thereof, in step N3.

As illustrated in FIG. 16, the determined numbers of counts are inputted to respective control units 51 and 52 of the controller 50 to drive the pair of sheet holding rollers 31. Thereafter, respective motor drivers 55 and 56 drive the first motor 61 and the second motor 63 (see FIG. 3) according to the respective numbers of counts of the respective encoders 53 and 54, and then the pair of sheet holding rollers 31 either rotates in the direction opposite the direction toward the sheet P or shifts in parallel in the width direction. In other words, the pair of sheet holding rollers 31 performs the pick up and hold operation, in step N4. After completion of the pick up and hold operation, the pair of sheet holding rollers 31 holds the sheet P. By so doing, as described above, the motor drivers 55 and 56 drive the first motor 61 and the second motor 63, and the pair of sheet holding rollers 31 performs the adjustment and feed operation, in step N5 of FIG. 15. When the pair of sheet holding rollers 31 performs the pick up and hold operation and the adjustment and feed operation, the respective encoders 53 and 54 feed back the position information of the pair of sheet holding rollers 31 moment by moment. Accordingly, the pair of sheet holding rollers 31 is controlled to move by the determined amount of movement.

Figure 13A:
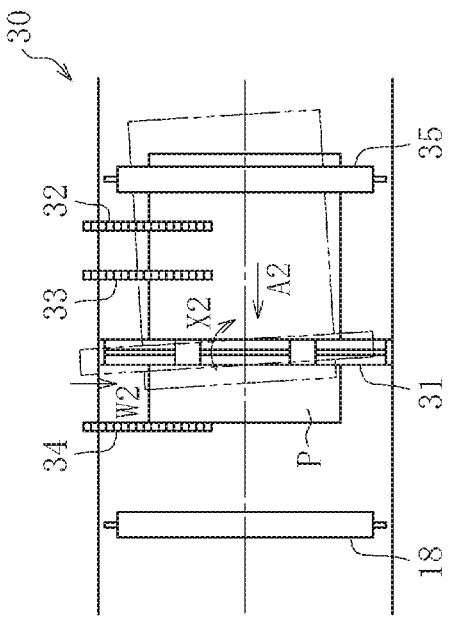
FIG. 13A is a diagram illustrating yet another subsequent step of the process of sheet conveyance and correction of the position by the sheet conveying device when printing the front face of the sheet.
Figure 13B:
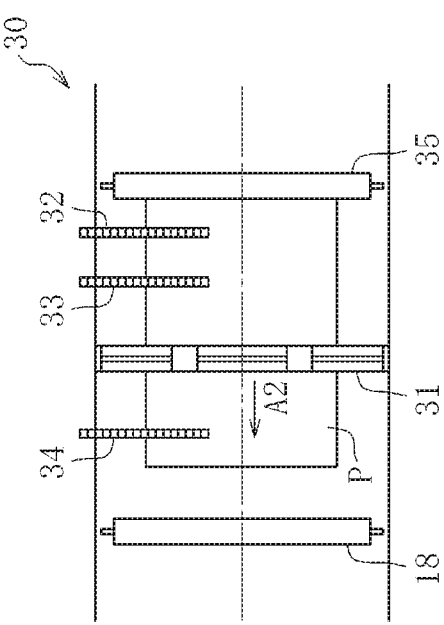
FIG. 13B is a side view illustrating the process of FIG. 13A.
Figure 17:
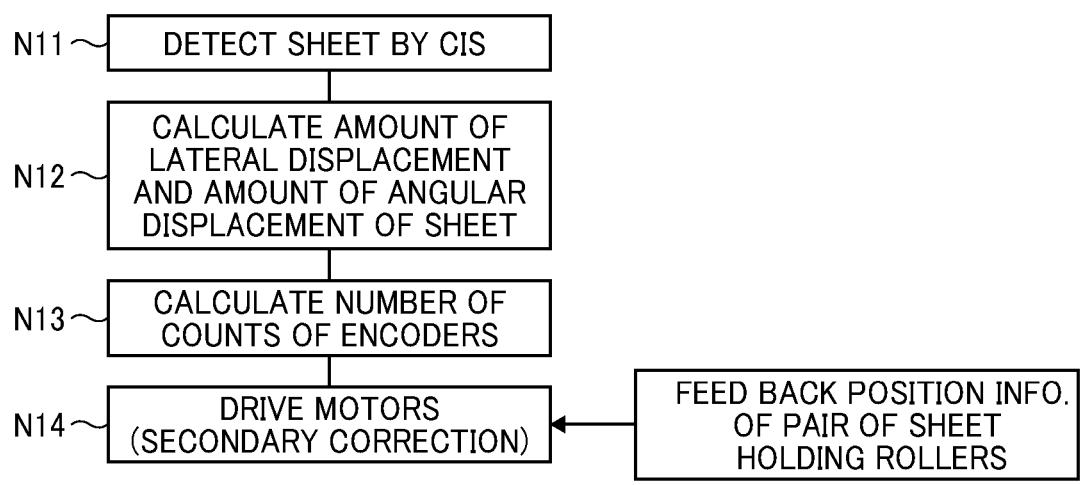
FIG. 17 is a flowchart of control of a process of a secondary correction.

Next, a description is given of a secondary correction that is another or subsequent correction of the positional deviation of the sheet P after the adjustment and feed operation, with reference to FIGS. 13A and 13B. FIG. 17 is a flowchart of control of a process of the secondary correction.

As illustrated in FIGS. 13A and 13B, as the pair of sheet holding rollers 31 conveys the sheet P further to the downstream side of the sheet conveying direction, the sheet P comes to face the third CIS 34. Then, the second CIS 33 and the third CIS 34 detect the sheet P, in step N11, and detect an amount of lateral displacement of the sheet P and an amount of angular displacement of the sheet P, in step N12 in FIG. 17. Then, the number of counts of each of the encoders 53 and 54 is calculated based on the amount of positional deviation of the sheet P, in step N13. After completion of step N13, the pair of sheet holding rollers 31 rotates about the support shaft 73 and slides in the width direction, in step N14. Accordingly, the positional deviation of the sheet P is corrected again. Hereinafter, the above-described operation is referred to as a "secondary correction."

By performing the secondary correction, the positional deviation of the sheet P can be correct with higher accuracy. Specifically, after the first CIS 32 and the second CIS 33 have detected the positional deviation of the sheet P before the pick up and hold operation, the adjustment and feed operation that is a primary correction is performed to correct the positional deviation of the sheet P based on the detection result but is not performed to correct the positional deviation of the sheet P after the primary correction. In order to address this inconvenience, the secondary correction is performed after completion of the adjustment and feed operation. By so doing, the positional deviation of the sheet P after the primary correction, and therefore the positional deviation of the sheet P can be correct with high accuracy.

It is to be noted that the positional deviation of the sheet P after the primary detection of the positional deviation of the sheet P is mainly caused by skew of the sheet P while being conveyed by the pair of sheet conveying rollers 35, difference in direction from the pair of sheet holding rollers 31 (i.e., the leading end of the sheet P is not located in parallel with the pair of sheet holding rollers 31 in the longitudinal direction), fluttering of the sheet P and deviation in pressure of the pair of sheet holding rollers 31 in the width direction, both caused by application of pressure when the pair of sheet holding rollers 31 holds the sheet P, and skew of the sheet P while being held by the pair of sheet holding rollers 31.

During the secondary correction, the positional deviation of the sheet P is repeatedly (serially) corrected by the second CIS 33 and the third CIS 34 and the amount of correction of the position of the sheet P is adjusted each time of the corrections to perform a feed back control of the amount of movement of the pair of sheet holding rollers 31. That is, as described above, the positional deviation of the sheet P is generated while the position of the sheet P is being corrected (while the sheet P is being conveyed). Therefore, the positional deviation of the sheet P is detected moment by moment and the detection results are fed back to the amount of correction of pair of sheet holding rollers 31. By so doing, the amount of positional deviation of the sheet P can be corrected over the further downstream side of the sheet P in the sheet conveying direction, and therefore the positional deviation of the sheet P can be corrected with higher accuracy.

Figure 14A:
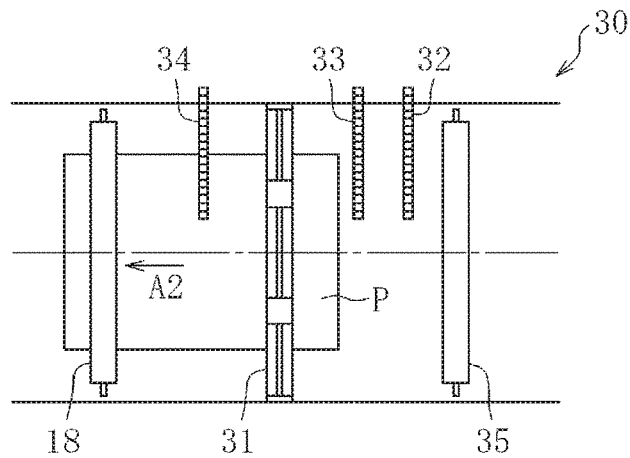
FIG. 14A is a diagram illustrating yet another subsequent step of the process of sheet conveyance and correction of the position by the sheet conveying device when printing the front face of the sheet.
Figure 14B:
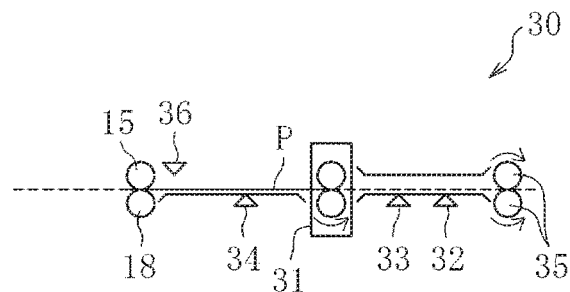
FIG. 14B is a side view illustrating the process of FIG. 13A.

As illustrated in FIGS. 14A and 14B, after completion of the secondary correction of the sheet P, the sheet P is conveyed toward the further downstream side of the sheet conveying direction. Then, on arrival of the sheet P at the secondary transfer position, the pair of sheet holding rollers 31 separates from the sheet P. Then, an image is transferred onto the sheet P at the secondary transfer position, and then the sheet P is conveyed to the further downstream side of the sheet conveying direction. At this time, the detection sensor 36 detects the arrival of the sheet P at the secondary transfer position, and the sheet conveying device 30 shifts to another operation for conveying a subsequent sheet.

As described above, the sheet conveying device 30 according to the present embodiment detects the amount of positional deviation of the sheet P by each CIS when an image is printed on the front face of the sheet P and corrects the positional deviation of the sheet P by the pair of sheet holding rollers 31. According to the configuration in which the sheet conveying device 30 is disposed immediately before the secondary transfer position in the sheet conveying direction, an image is transferred onto the sheet P in a state in which the positional deviation of the sheet P is corrected. Accordingly, the positional deviation of an image forming position can be prevented.

When a duplex printing is performed to the sheet P, the sheet P after completion of the fixing operation passes the sheet reversal passage 6b (see FIG. 1) and travels to the sheet conveyance passage 6 while the sheet P is reversed with the front face down. When printing an image on the back face (the second face) of the sheet P, the sheet conveying device 30 does not correct the positional deviation of the sheet P, which is different when printing the front face (the first face) of the sheet P, but performs matching of a position of an image to be formed on the back face of the sheet P to the position of the image formed on the front face of the sheet P. Specifically, when printing an image on the back face of the sheet P, the respective CISs, which are the first CIS 32, the second CIS 33 and the third CIS 34 provided to the sheet conveying device 30, read the position of the image formed on the front face of the sheet P. Based on the results, the sheet P is turned at a corresponding angle or moved in the width direction so as to match the position of the image to be formed on the back face of the sheet P and the position of the image formed on the front face of the sheet P.

Now, a description is given of a method of matching the position of the image formed on the front face of the sheet P and the position of an image to be formed on the back face of the sheet P when printing the image on the back face of the sheet P.

It is to be noted that the term the "front face" of the sheet P indicates a surface of the sheet P on which an image is firstly formed by the image forming apparatus 1 during a duplex printing and the "back face" of the sheet P indicates an opposite surface of the sheet P on which another image is secondly formed after completion of the printing of the front face of the sheet P.

Figure 18A:
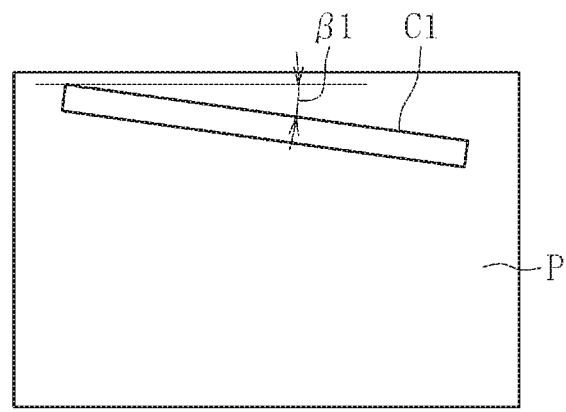
FIG. 18A is a diagram illustrating an angular displacement of an image formed on the front side of the sheet.

As illustrated in FIG. 18A, a test image C1 having a rectangular shape is formed on the front face of the sheet P during the printing of the front face of the sheet in the duplex printing. The test image C1 is formed on the front face of the sheet P to be read by the image forming apparatus 1 when each CIS detects when printing another image on the back face of the sheet P.

Figure 18B:
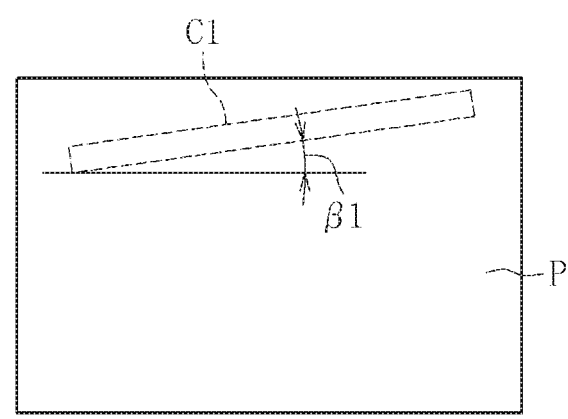
FIG. 18B is a diagram illustrating the angular displacement of the image on the front face of the sheet, viewed form the back side of the sheet.

Even when the sheet P is conveyed to the secondary transfer position while the front of the leading end of the sheet P faces a longitudinal line of the sheet conveyance passage 6 (see FIG. 1) without generating any positional deviation, the image is formed on the sheet P that is misaligned due to a positional deviation during the transfer. The test image C1 is to be formed parallel to the sheet P. However, due to positional deviation during the image transfer, the test image C1 is formed in a sloped state to the sheet P by an angle of slope $\beta 1$ in the clockwise direction. As illustrated in FIG. 18B, the direction of slope of the test image C1 is reversed along with the reverse of the sheet P when the test image C1 is formed on the back face of the sheet P.

The test image C1 to be formed on the sheet P has a length extending in the sheet conveying direction, which is greater than a distance between the first CIS 32 and the second CIS 33 and a distance between the second CIS 33 and the third CIS 34. Due to this configuration, two CISs can simultaneously face the test image C1, and therefore can detect the position of the test image C1 by a method described below. In addition, the test image C1 is not a line form but has a rectangular shape so that the test image C1 has a constant width to be detected by each CIS.

It is preferable that the test image C1 is colored to have a color with which a boundary to the surface of a sheet can be read easily. For example, since the sheet P is white, the test image C1 is colored in black in the present embodiment. Consequently, a reading accuracy of a boundary of the image and the surface of the sheet P, and therefore each CIS can read the position of an image formed on the front face of the sheet P with accuracy.

Consequently, a reading accuracy of a boundary of the image and the surface of the sheet P, and therefore each CIS can read the position of an image formed on the front face of the sheet P with accuracy. Accordingly, it is preferable that the test image C1 is formed at a position that does not bother an original image to be formed on the sheet P.

Figure 19:
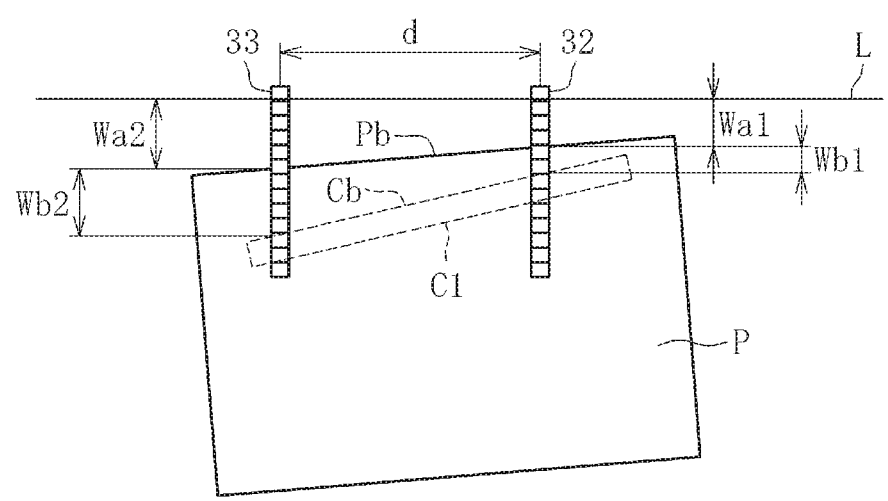
FIG. 19 is a diagram illustrating how to calculate the amount of lateral displacement of an image formed on the front face of the sheet and the amount of angular displacement of the image by each CIS.

Next, a description is given of a method of reading the position of the image by each CIS, with reference to FIG. 19.

As illustrated in FIG. 19, the first CIS 32 and the second CIS 33, both disposed facing the sheet P, read the position of an edge Cb of the test image C1 formed on the front face (the back side of the drawing sheet of FIG. 19) of the sheet P, at respective positions of the first CIS 32 and the second CIS 33. With this configuration, distances Wb1 and Wb2 from a side end Pb of the sheet P to the test image C1 are obtained. Therefore, the amount of lateral displacement of the test image C1 to the sheet P is calculated as (Wb1+Wb2)/2.

Further, using the distance d of the first CIS 32 and the second CIS 33 previously obtained, an amount of slope of the test image C1 to the sheet P is calculated using an expression of (Wb1−Wb2)/d.

It is to be noted that, regarding the amounts of positional deviation of the sheet P, the amount of lateral displacement of the sheet P can be obtained by an expression of (Wa1+Wa2)/2 and the amount of angular displacement of the sheet P can be obtained by an expression of (Wa1−Wa2)/d.

Based on the amount of positional deviation of the sheet P to the ideal position L of the sheet P and the amount of positional deviation of the image to the sheet P, an amount of positional deviation of the image to the sheet conveyance passage can be obtained. It is to be noted that the second CIS 33 and the third CIS 34 can be used to calculate the amount of positional deviation with the above-described method.

Next, a description is given of a method of matching the position of the test image C1 formed on the front face of the sheet P and the position of an image to be formed on the back face of the sheet P.

To simplify the following descriptions, a method of matching the positions regarding the slope of the test image C1 and the slope of the image to be formed on the back face of the sheet P is explained first, and then a method of matching the positions regarding the amount of lateral displacement of the image.

Further, for simplicity, the following descriptions explain a case in which the sheet P has no positional deviation to the sheet conveyance passage. However, the position matching is actually performed under consideration of the amount of angular displacement of the sheet P and the amount of lateral displacement of the sheet P.

It is to be noted that the method of matching the positions of the images is not constantly based on both of the lateral displacement (i.e., a positional error) and the angular displacement (i.e., a directional error). For example, in a case in which either one of the lateral displacement and the angular displacement is not usually generated at transfer, the other one of the lateral displacement or the angular displacement, which is generated more easily, can be corrected.

There are two methods of matching the positions of the images based on assumptions about at which position the image to be transferred onto the back face of the sheet P is actually formed.

First, a description is given of a first method of matching the positions of the images based on the assumption that an image to be formed on the back face of the sheet P does not cause a positional deviation at transfer.

Figure 20A:
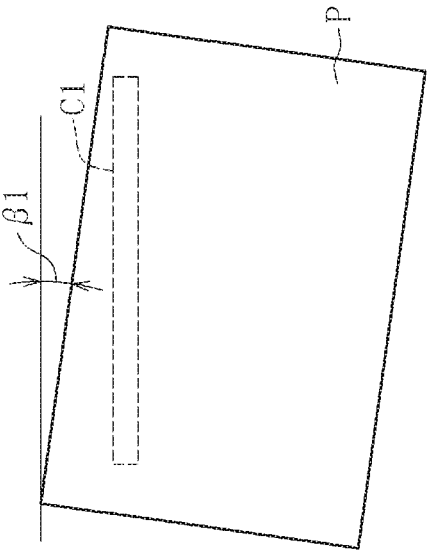
FIG. 20A is a diagram illustrating how to perform a first positioning before rotation of the sheet.

As illustrated in FIG. 20A, which is viewed from the back face of the sheet P, the test image C1 that is formed on the front face of the sheet P is displaced by the angle of slope β1 to the sheet P in a counterclockwise direction. By contrast, a test image C2 is assumed to be formed to face the longitudinal line of the sheet conveyance passage, on the back face of the sheet P. In FIG. 20A, the sheet P has no angular displacement, and therefore the test image C2 is formed in parallel to the sheet P. As a result, there is a positional deviation between the test image C1 formed on the front face of the sheet P and the test image C2 to be formed on the back face of the sheet P.

Figure 20B:
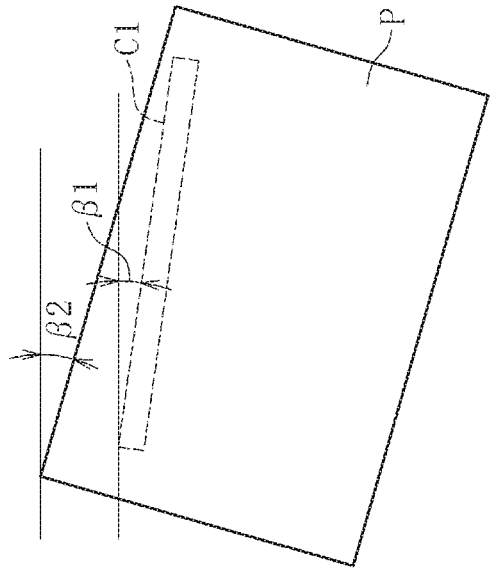
FIG. 20B is a diagram illustrating how to perform the first positioning after the rotation of the sheet.

In order to match the position of the test image C2 to be formed on the back face of the sheet P and the test image C1 formed on the front face of the sheet P, the sheet P is rotated by the pair of sheet holding rollers 31. Specifically, as illustrated in FIG. 20B, the sheet P is turned to a position having the angle of slope β1 in the clockwise direction that is an opposite direction to the slope of the test image C1 viewed from the back face of the sheet P, relative to the sheet conveyance passage. Accordingly, the test image C1 formed on the front face of the sheet P has no slope to the sheet conveyance passage, and therefore matches with the ideal position L of the test image C2 to be formed on the back face of the sheet P as illustrated in FIG. 20A. That is, the position of the test image C1 formed on the front face of the sheet P can be matched with the relative position of the test image C2 to be formed on the back face of the sheet P.

The above-described method of matching the positions of the images is effective to use when there is a positional deviation at transfer without reproducibility during image formation on the front face of the sheet P and when there is no positional deviation during a regular image formation. Hereinafter, this method is referred to as a "first position matching method".

Next, a description is given of a second method of matching the positions of the images based on the assumption that an image to be formed on the back face of the sheet P causes the same positional deviation on the front face of the sheet P.

Figure 21A:
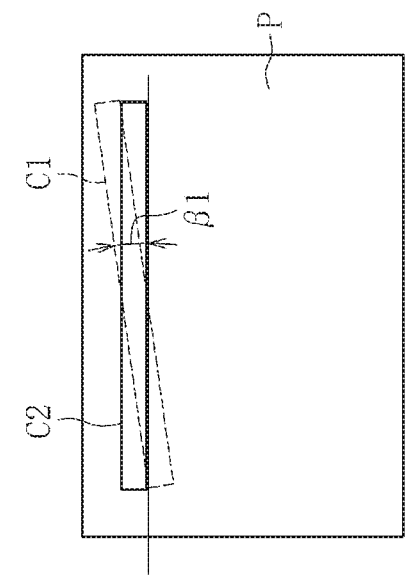
FIG. 21A is a diagram illustrating how to perform a second positioning before rotation of the sheet.

As illustrated in FIG. 21A, the test image C1 formed on the front face of the sheet P is sloped by the angle of slope β1 in the counterclockwise direction, when viewed from the back face of the sheet P. In other words, the test image C1 is sloped on the front face of the sheet P by the angle of slope β1 in the clockwise direction. Hereinafter, the slope of the test image C1 by the angle of slope β1 is referred to an amount of assumed displacement.

Figure 21B:
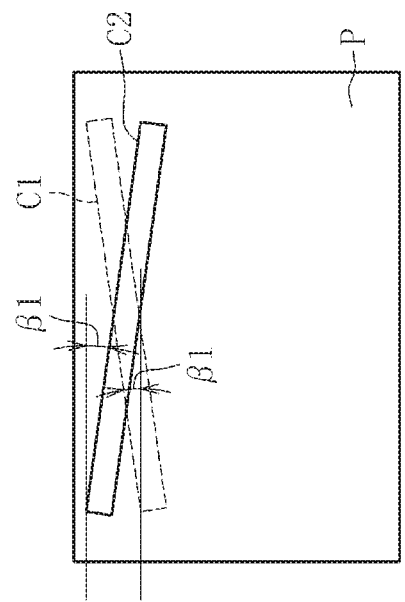
FIG. 21B is a diagram illustrating how to perform the second positioning after the rotation of the sheet.

Similar to the image formation of the test image C1 onto the front face of the sheet P, the test image C2 to be formed on the back face of the sheet P is assumed to obliquely shift by the angle of slope β1 in the clockwise direction. Hereinafter, the obliquely shifted position of the test image C2 on the back face of the sheet P is referred to as an "assumed image forming position." In this case, as illustrated in FIG. 21B, the sheet P is rotated to a position obliquely shifted by an angle of slope P2 in the clockwise direction, which is an opposite direction to the direction in which the test image C1 is rotated, when viewed from the back face of the sheet P. The angle of slope β2 is an angle twice the angle of slope β1. According to this rotation of the test image C2, the test image C1 formed on the front face of the sheet P is obliquely shifted by the angle of slope β1 in the clockwise direction to the sheet conveyance passage, when viewed form the back face of the sheet P. Accordingly, the position of the test image C1 illustrated in FIG. 21B is matched to the assumed image forming position on the back face of the sheet P (see the test image C2 illustrated in FIG. 21A). That is, the position of the test image C1 formed on the front face of the sheet P can be matched with the relative position of an image (i.e., the test image C2 in the present embodiment) to be formed on the back face of the sheet P.

The above-described method of matching the positions of the images is effective to use when there is a positional deviation at transfer with reproducibility during image formation on the front face of the sheet P. Hereinafter, this method is referred to as a "second position matching method".

Figure 22:
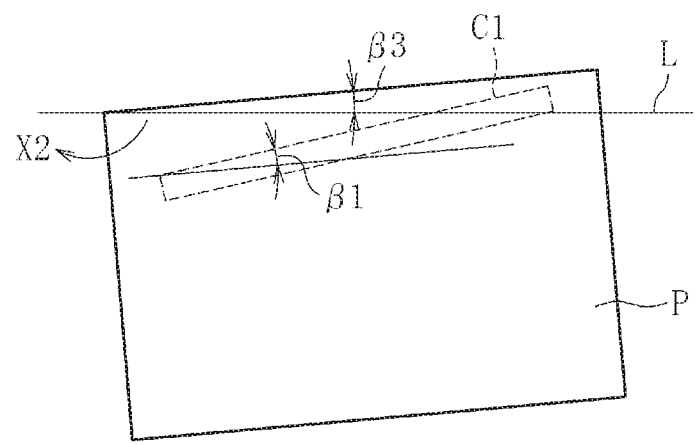
FIG. 22 is a diagram illustrating a sheet obliquely deviated to a sheet conveyance passage and an image formed on the sheet.

The above descriptions explained a case in which the sheet P is not angularly shifted to the sheet conveyance passage. However, in a case in which the sheet P is angularly shifted to the sheet conveyance passage, this amount of angular shift of the sheet P to the sheet conveyance passage is added to the previously calculated amount of rotation of the sheet P. By rotating the sheet P by the sum of the amounts of rotation, the positions of the images can be matched. Specifically, when an image is printed on the back face of the sheet P, the sheet P is obliquely shifted by an angle of slope β3 to the sheet conveyance passage (to a parallel line L), as illustrated in FIG. 22. Further, the relation of the position of the test image C1 formed on the front face of the sheet P and the position of the sheet P is the same as the relation illustrated in FIGS. 20A through 21B. That is, when viewed form the back face of the sheet P, the test image C1 is obliquely shifted by the angle of slope β1 to the sheet P in the counterclockwise direction, based on the left side of the drawing. In this case, the sheet P is rotated by the sum of the angle of slope β1 and the angle of slope β3 in the direction indicated by arrow X2 (i.e., the clockwise direction) in the first position matching method, so that the position of the sheet P and the position of the test image C1 can be matched to the positions illustrated in FIG. 20B. By contrast, the sheet P is rotated by the sum of the angle of slope β2 and the angle of slope β3 in the direction indicated by arrow X2 in the second position matching method, so that the position of the sheet P and the position of the test image C1 can be matched to the positions illustrated in FIG. 21B. Accordingly, by adding the angle of slope β3 of the sheet P to the sheet conveyance passage to the amount of rotation of the sheet P, the positions of the images can be matched.

When printing an image on the back face of the sheet P, the sheet conveying device 30 performs the position matching operation of the images with the above-described methods.

Figure 23A:
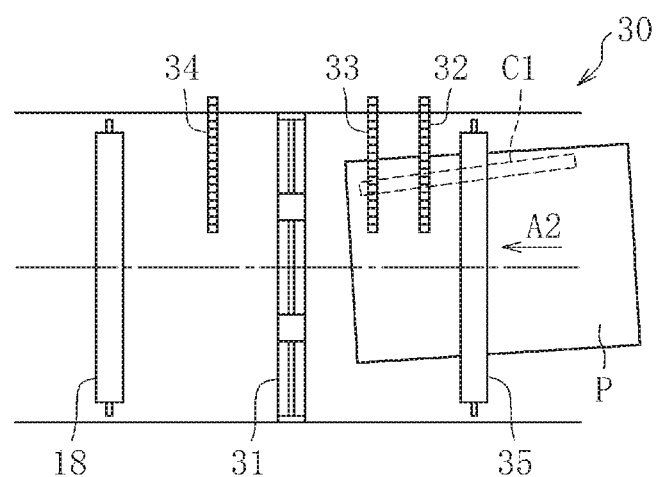
FIG. 23A is a plan view illustrating one step of a process of sheet conveyance and correction of a position of a sheet by the sheet conveying device when printing a back face of the sheet.
Figure 26A:
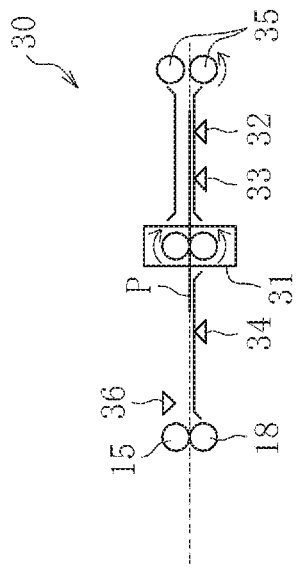
FIG. 26A is a diagram illustrating yet another subsequent step of the process of sheet conveyance and correction of the position of the sheet by the sheet conveying device when printing the back face of the sheet.
Figure 26B:
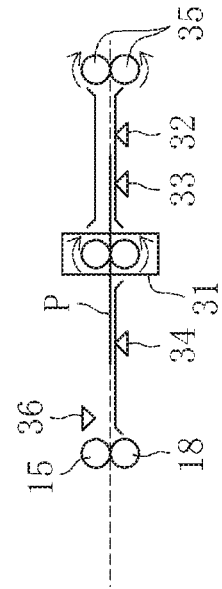
FIG. 26B is a side view illustrating the process of FIG. 26A.
Figure 27A:
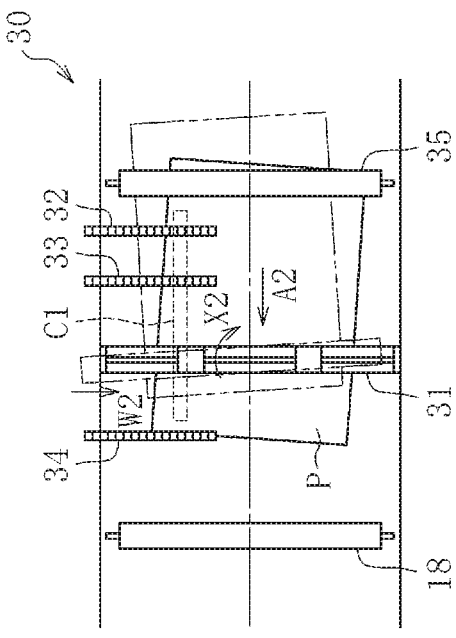
FIG. 27A is a diagram illustrating yet another subsequent step of the process of sheet conveyance and correction of the position of the sheet by the sheet conveying device when printing the back face of the sheet.
Figure 27B:
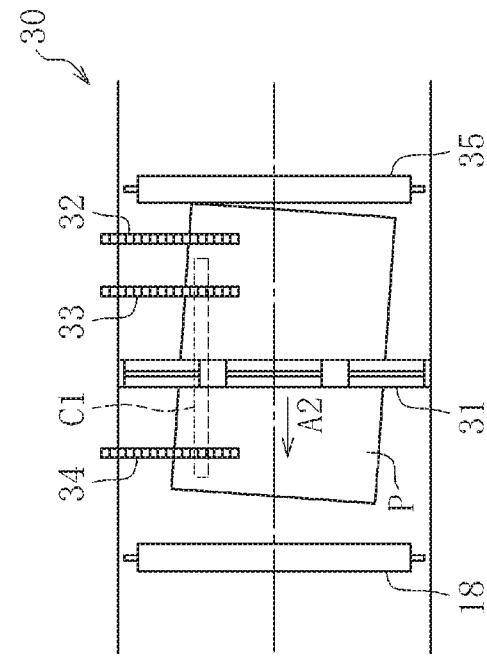
FIG. 27B is a side view illustrating the process of FIG. 27A.
Figure 28A:
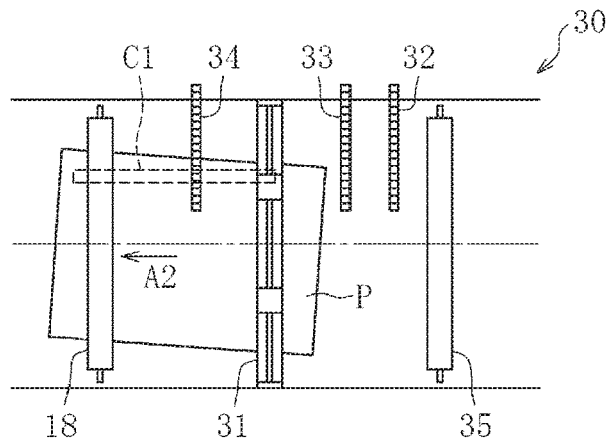
FIG. 28A is a diagram illustrating yet another subsequent step of the process of sheet conveyance and correction of the position of the sheet by the sheet conveying device when printing the back face of the sheet.
Figure 28B:
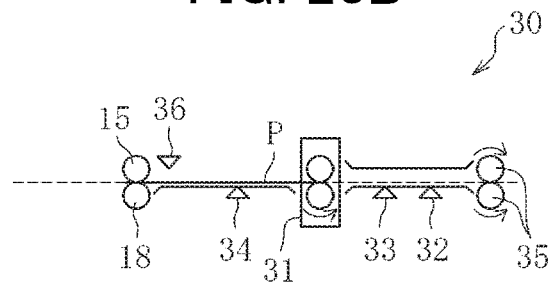
FIG. 28B is a side view illustrating the process of FIG. 28A.

Now, a description is given of processes in which the sheet conveying device 30 performs the position matching of the images while conveying the sheet P, with reference to FIGS. 23A through 28B. FIG. 23A is a plan view illustrating one step of a process of sheet conveyance and correction of a position of the sheet P by the sheet conveying device 30 when printing a back face of the sheet P. FIG. 23B is a side view illustrating the process of FIG. 23A. FIG. 24A is a diagram illustrating a subsequent step of the process of sheet conveyance and correction of the position of the sheet P by the sheet conveying device 30 when printing the back face of the sheet P. FIG. 24B is a side view illustrating the process of FIG. 24A. FIG. 25A is a diagram illustrating another subsequent step of the process of sheet conveyance and correction of the position of the sheet P by the sheet conveying device 30 when printing the back face of the sheet P. FIG. 25B is a side view illustrating the process of FIG. 25A. FIG. 26A is a diagram illustrating yet another subsequent step of the process of sheet conveyance and correction of the position of the sheet P by the sheet conveying device 30 when printing the back face of the sheet P. FIG. 26B is a side view illustrating the process of FIG. 26A. FIG. 27A is a diagram illustrating yet another subsequent step of the process of sheet conveyance and correction of the position of the sheet P by the sheet conveying device 30 when printing the back face of the sheet P. FIG. 27B is a side view illustrating the process of FIG. 27A. FIG. 28A is a diagram illustrating yet another subsequent step of the process of sheet conveyance and correction of the position of the sheet P by the sheet conveying device 30 when printing the back face of the sheet P. FIG. 28B is a side view illustrating the process of FIG. 28A.

Figure 23B:
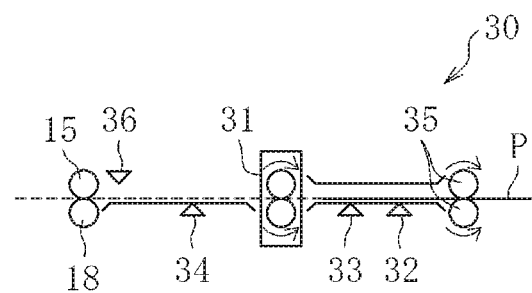
FIG. 23B is a side view illustrating the process of FIG. 23A.

First, after having passed through the sheet reversal passage 6b (see FIG. 1), the sheet P is conveyed to the pair of sheet conveying rollers 35 of the sheet conveying device 30 again, with the front and back of the sheet P reversed. Then, as illustrated in FIGS. 23A and 23B, the pair of sheet conveying rollers 35 conveys the sheet P toward the first CIS 32. When the sheet P comes to a position at which the sheet P is located opposite the first CIS 32 and the second CIS 33, each of the first CIS 32 and the second CIS 33 reads the position of the sheet P and the position of the test image C1.

In the present embodiment, the first CIS 32, the second CIS 33 and the third CIS 34 are disposed facing an opposite side face of the image forming side of the sheet P. Specifically, as illustrated in FIG. 23B, the image is transferred from the intermediate transfer belt 16 onto the sheet P at the secondary transfer position that is the image forming position to the sheet P, from the side of the secondary transfer opposing roller 15 (i.e., from the upper side of FIG. 23B and one side of the sheet P). Then, the first CIS 32 and the second CIS 33 face the sheet P from the other side (i.e., from the lower side of FIG. 23B) that is an opposite side at which the secondary transfer opposing roller 15 is disposed. Accordingly, when forming an image on the back face of the sheet P, both the first CIS 32 and the second CIS 33 face the front face of the sheet P, and therefore the first CIS 32 and the second CIS 33 can read the position of the test image C1 formed on the front face of the sheet P. However, in a case in which the test image C1 formed on the front face of the sheet P is readable from the other side of the sheet P, the first CIS 32 and the second CIS 33 may be disposed on the side of the image forming face of the sheet P.

Figure 24A:
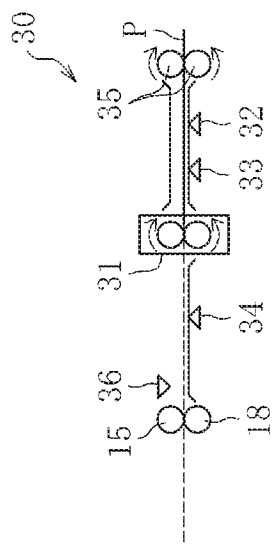
FIG. 24A is a diagram illustrating a subsequent step of the process of sheet conveyance and correction of the position of the sheet by the sheet conveying device when printing the back face of the sheet.
Figure 24B:
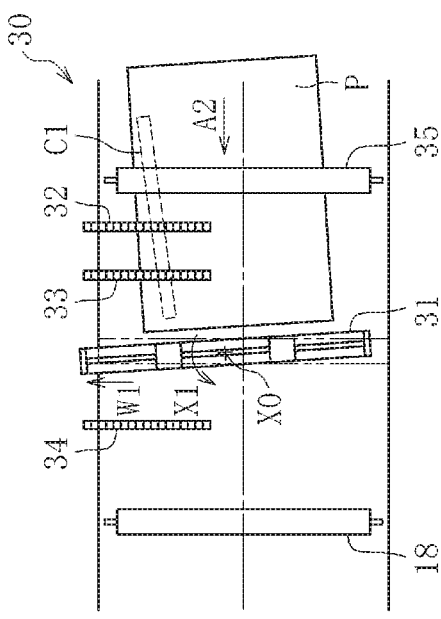
FIG. 24B is a side view illustrating the process of FIG. 24A.

Then, as illustrated in FIGS. 24A and 24B, the pair of sheet holding rollers 31 performs the pick up and hold operation based on the detection result of the first CIS 32 and the second CIS 33 regarding the position of the sheet P.

Figure 25A:
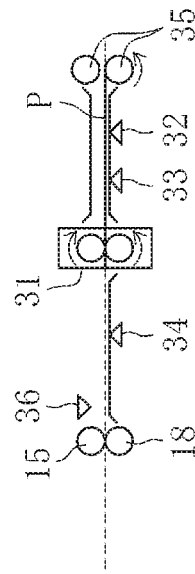
FIG. 25A is a diagram illustrating another subsequent step of the process of sheet conveyance and correction of the position of the sheet by the sheet conveying device when printing the back face of the sheet.
Figure 25B:
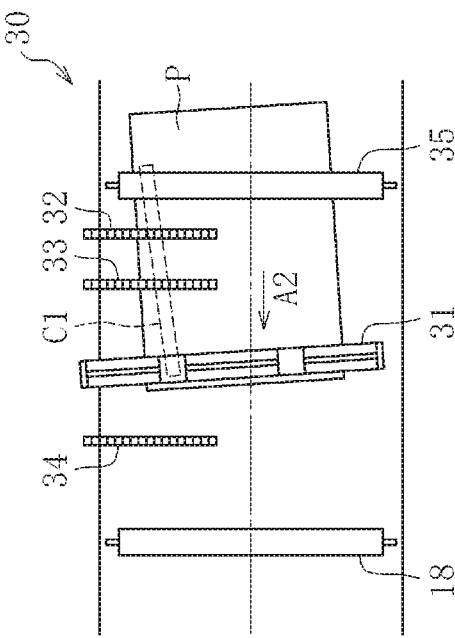
FIG. 25B is a side view illustrating the process of FIG. 25A.

As illustrated in FIGS. 25A and 25B, as the sheet P is further conveyed to the downstream side of the sheet conveying direction to a position opposite the pair of sheet holding rollers 31, the pair of sheet holding rollers 31 holds the sheet P and the pair of sheet conveying rollers 35 releases the sheet P. The above-described operations are same as the printing of an image on the front face of the sheet P.

Then, as illustrated in FIGS. 26A and 26B, the pair of sheet holding rollers 31 with the sheet P held thereby performs the adjustment and feed operation while conveying the sheet P to the downstream side of the sheet conveying direction. Specifically, the pair of sheet holding rollers 31 move in parallel to the direction indicated by arrow W2 based on the detection result of the first CIS 32 and the second CIS 33 regarding the position of the sheet P in the width direction. In addition, the pair of sheet holding rollers 31 rotates in the direction indicated by arrow X2 based on the detection result of the first CIS 32 and the second CIS 33 regarding the amount of angular displacement of the test image C1 formed on the front face of the sheet P and the amount of angular displacement of the sheet P. Accordingly, the sheet P moves from a position indicated by a broken line in FIG. 26A to a position indicated by a solid line in FIG. 26A. At this time, a target position of the sheet P in the width direction after correction by the pair of sheet holding rollers 31 is an ideal position of the sheet P that is same as the ideal position L when printing the front face of the sheet P.

Different from the printing of an image on the front face of the sheet P, the target position of the sheet P in the direction of rotation is not a position facing the longitudinal line of the sheet conveyance passage but a position obliquely shifted to the sheet conveyance passage. Specifically, as illustrated in FIG. 18B and FIG. 20B, the target position of the sheet P in the direction of rotation is a position to match the image forming position on the back face of the sheet P to the image forming position on the front face of the sheet P. In FIG. 26, the first position matching method is employed, and therefore the sheet P is rotated to the target position at which the test image C1 formed on the front face of the sheet P becomes parallel to the sheet conveyance passage (see FIG. 18B).

Figure 29:
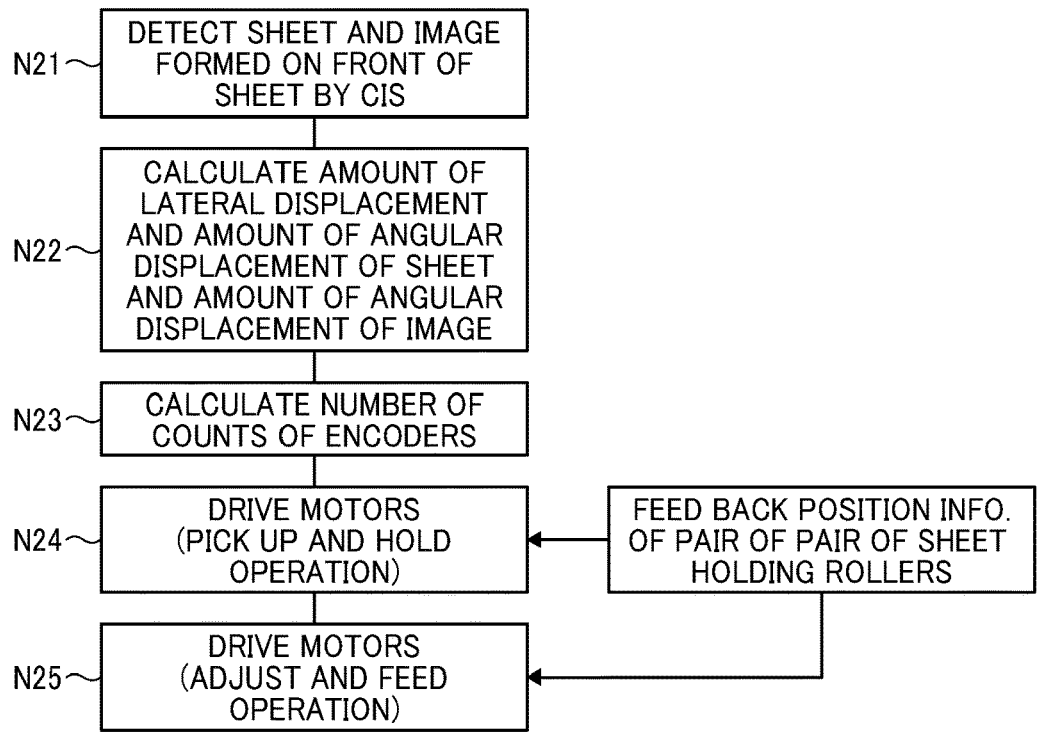
FIG. 29 is a flowchart of the processes of movement of the sheet, illustrated in FIGS. 23A through 26B.

FIG. 29 is a flowchart of the processes of movement of the sheet P before the image formation onto the back face of the sheet P.

As illustrated in steps N21 through N25, this operation is performed with the same processes as the correction of position of the image on the front face of the sheet P. However, the operation in the flowchart of FIG. 29 is different from the correction of position of the image on the front face of the sheet P in that the CISs detect the test image C1 formed on the front face of the sheet P in step N21 and detect the amount of angular displacement of the test image C1 in step N22.

Specifically, the CISs detect the sheet P and the test image C1 formed on the front face of the sheet P in step N21 and then detect the amount of lateral displacement of the sheet P, the amount of angular displacement of the sheet P and the amount of angular displacement of the test image C1 in step N22. Further, each of the encoders 53 and 54 calculates the number of counts thereof in step N23. Then, the pair of sheet holding rollers 31 performs the pick up and hold operation, in step N24, and then performs the adjustment and feed operation, in step N25. The calculation of the number of counts of each of the encoders 53 and 54 in step N23 and the adjustment and feed operation in step N25 are performed to match the position of the test image C1 formed on the front face of the sheet P to the position of the test image C2 to be formed on the back face of the sheet P, as described above.

Next, a description is given of description is given of the secondary correction to be performed before image formation to the back face of the sheet P.

As illustrated in FIGS. 27A and 27B, as the sheet P is conveyed further to the downstream side of the sheet conveying direction and the test image C1 comes to a position facing the third CIS 34, the secondary correction is performed based on the detection results of the image position and the sheet position obtained by the second CIS 33 and the third CIS 34.

Figure 30:
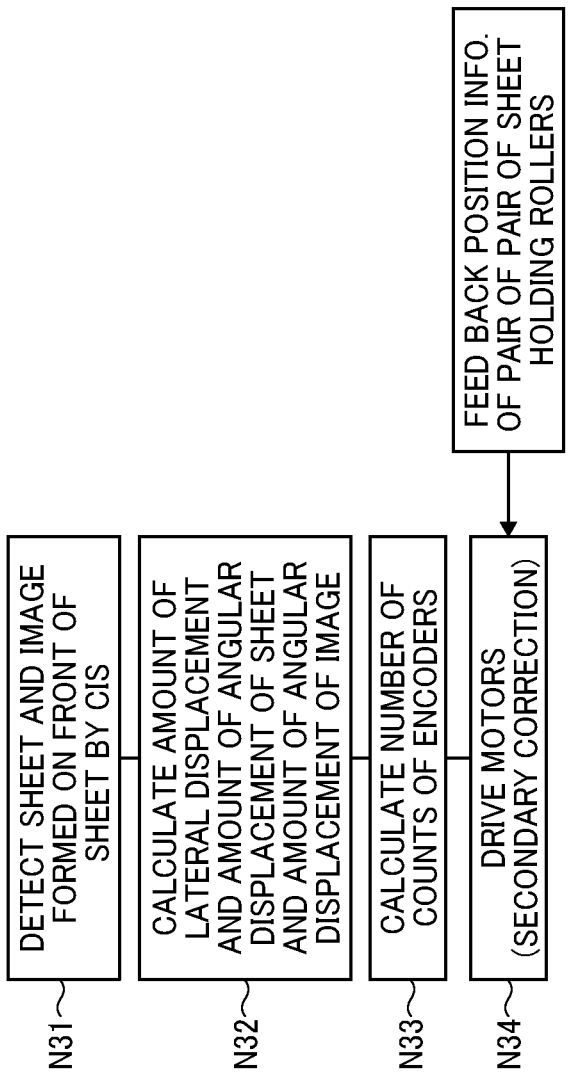
FIG. 30 is a flowchart of process of the secondary correction.

The secondary correction described above is performed along the processes of steps N31 through N34 in a flowchart illustrated in FIG. 30. At this time, the secondary correction is performed to match the position of the test image C1 formed on the front face of the sheet P to the position of the test image C2 to be formed on the back face of the sheet P, which is same as the adjustment and feed operation in step N25 of FIG. 29.

In the present embodiment, the CISs detect the sheet P and the test image C1 formed on the front face of the sheet P again in step N31, and then detect the amount of lateral displacement of the sheet P, the amount of angular displacement of the sheet P and the amount of angular displacement of the test image C1 in step N32. Further, each of the encoders 53 and 54 calculates the number of counts thereof in step N33. Then, the pair of sheet holding rollers 31 performs the correction (as a position corrector), in step N34. However, the flow of the secondary correction is not limited thereto. For example, a process in which one of the sheet P and the test image C1 is detected and the detection of the other is omitted may be employed. That is, in steps N21 and N22 in the flowchart of FIG. 29, a relation of relative position of the sheet P and the test image C1 formed on the front face of the sheet P is confirmed. Consequently, by detecting either one of the sheet P and the test image C1, the amount of angular displacement and the amount of lateral displacement of the other may be calculated based on the relation of the relative position.

It is to be noted that, since each CIS has a reading error, it is preferable that both of the sheet P and the test image C1 are detected in step N31 to calculate the relation of the relative position of the sheet P and the test image C1 and that the relative position of the sheet P and the test image C1 is obtained based on a mean value of the relative position of the sheet P and the test image C1, which is obtained by detection and calculation in step N21. Accordingly, the reading error of the relative position of the sheet P and the test image C1 is restrained to a minimum value, and therefore the better secondary correction with higher accuracy is performed in step N34.

While the test image C1 (or the sheet P) remains facing the second CIS 33 and the third CIS 34, the second CIS 33 and the third CIS 34 repeatedly detect the position of the sheet P and the position of the test image C1 formed onto the sheet P. The detection result is fed back to the amount of correction of the sheet P for the secondary correction. Accordingly, the positional deviation of the sheet P generated after detection of the position of the sheet P and the position of the test image C1 before the pick up and hold operation can be corrected. By so doing, the position of the test image C1 formed on the front face of the sheet P and the position of the test image C2 to be formed on the back face of the sheet P can be matched with high accuracy.

As illustrated in FIGS. 28A and 28B, the sheet P reaches the secondary transfer position, and the image is formed on the back face of the sheet P in a state in which the position of the image formed on the front face of the sheet P and the position of the image to be formed on the back face of the sheet P are matched (overlaid).

As described above, the sheet conveying device 30 according to the present embodiment has the configuration in which the respective CISs read the position of the image formed on the front face of the sheet P and the sheet P is rotated based on the detection result, so that the position of the image on the front face of the sheet P and the position of the image on the back face of the sheet P can be matched. Accordingly, by rotating the sheet P to adjust the position of an image to be formed on the back face of the sheet P according to the position of the image on the front face of the sheet P, even in a case in which the positional deviation of the sheet P is generated at transfer of the image, the position of the image on the front face of the sheet P and the position of the image on the back face of the sheet P can be matched.

In addition, since the sheet conveying device 30 according to the present embodiment can match the positions of the images on the front face and the back face of the sheet P without adjusting the transfer position of the sheet P, the number of processes in adjustment of the positions of the images can be reduced. Further, the reduction in the number of processes in adjustment of the positions of the images can reduce the period of time for duplex printing, and therefore can increase the speed of operation of the image forming apparatus 1.

Figure 31:
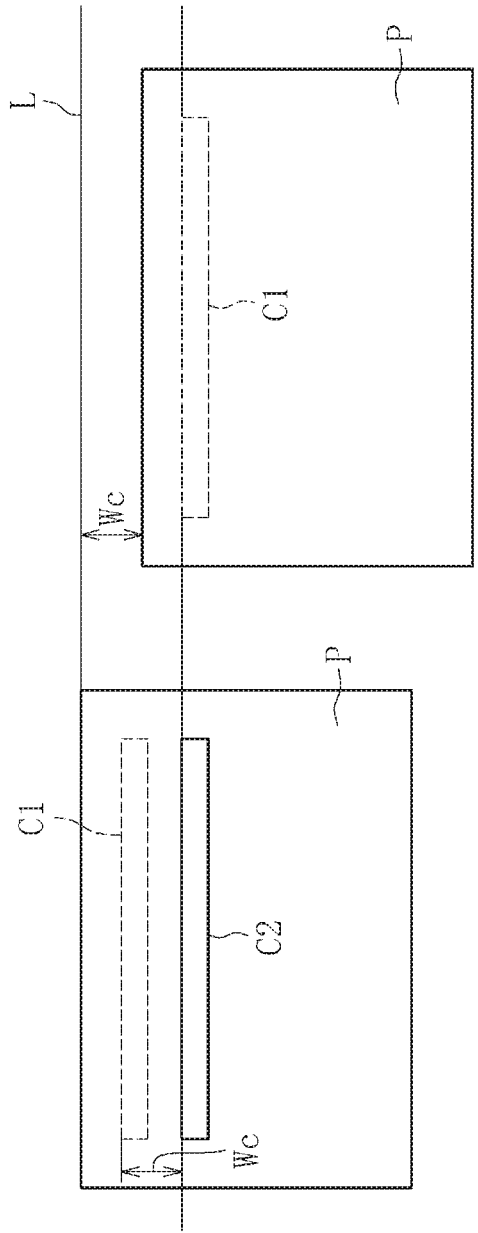
FIG. 31 is a diagram illustrating how to correctly position the image in the width direction.

Next, a description is given of a method of correcting (matching) the position of an image formed on the front face of the sheet P and the position of an image to be formed on the back face of the sheet P, with reference to FIG. 31. FIG. 31 is a diagram illustrating how to correctly position of the image in the width direction.

It is to be noted that, for simplicity of the following descriptions, FIG. 31 illustrated a case in which the test image C1 has the lateral displacement alone. That is, the sheet P has neither lateral displacement nor angular displacement and the test image C1 has no angular displacement in the case illustrated in FIG. 31.

First, a description is given of a case using the first position matching method.

As illustrated on the sheet P on the left side of FIG. 31, the test image C1 formed on the front face of the sheet P is laterally shifted by a distance Wc to the upper side of FIG. 31 to a target image forming position. In this case, as illustrated on the sheet P on the left side of FIG. 31, the test image C2 to be formed on the back face of the sheet P is assumed to be separated from the test image C1 by the distance Wc. Therefore, as illustrated on the sheet P on the right side of FIG. 31, the pair of sheet holding rollers 31 moves the sheet P by the distance Wc from the ideal position L on the sheet conveyance passage to the lower side of FIG. 31. Accordingly, the position of the test image C1 formed on the front face of the sheet P is matched to (overlaid onto) the test image C2 to be formed on the back face of the sheet P, so that the images are positioned correctly.

It is to be noted that, in a case in which the sheet P is laterally shifted from the ideal position L, the sheet P is shifted by the amount of movement of the sheet P determined (calculated) by adding the distance Wc (i.e., the above-described slid amount of the sheet P) to the amount of lateral displacement of the sheet P.

As described above, when employing the first position matching method, the amount of lateral displacement of the image is calculated based on the detection results of the respective CISs before the image is formed on the back face of the sheet P (i.e., steps N21 and N22 in FIG. 29 or steps N31 and N32 in FIG. 30). Then, the pair of sheet holding rollers 31 performs the pick up and hold operation and the adjustment and feed operation or the correction based on the above-described detection results. Accordingly, the lateral displacement of the image is corrected and the position of the test image C1 formed on the front face of the sheet P is matched to the image to be formed on the back face of the sheet P, so that the images are positioned correctly.

Further, when employing the second position matching method, the side end Pb of the sheet P is matched to the ideal position L, which is the same process as the image formation to the front face of the sheet P, and the amount of lateral displacement of the image is not corrected. The above-described process is performed based on the assumption that the position of the image to be formed on the back face of the sheet P is shifted, same as the image on the front face of the sheet P, by the distance Wc to the target image forming position of the sheet P. In other words, for the correction of the lateral displacement of the image in the second position matching method, it is assumed that the test image C1 formed on the front face of the sheet P is matched to the position of the image to be formed on the back face of the sheet P in the width direction without positioning the images.

The recording medium that may be used in this disclosure is not limited to the sheet P (a plain paper) but also includes thick paper, post card, envelope, thin paper, coated paper, art paper, tracing paper, an OHP film sheet, a plastic film sheet, a prepreg sheet, a copper foil and the like.

The image forming apparatus 1 according to the present embodiment of this disclosure is applicable not only to a color image forming apparatus illustrated in FIG. 1 but also to a monochrome image forming apparatus, copier, printer, facsimile machine, or multifunction printer including at least two functions of the copier, printer, and facsimile machine.

In the present embodiment, the sheet conveying device 30 is provided to the electrophotographic image forming apparatus 1. However, the configuration is not limited thereto. For example, this disclosure can be also applied to a sheet conveying device that is provided to an inkjet image forming apparatus.

Figure 32:
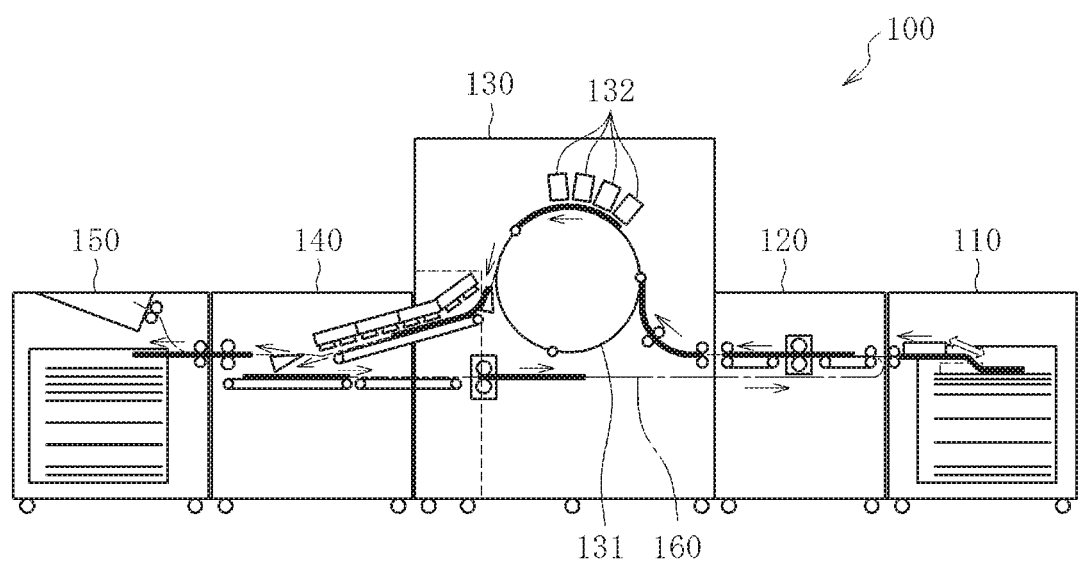
FIG. 32 is a diagram illustrating a schematic configuration of an inkjet image forming apparatus.

Next, a description is given of a basic configuration and operations of an inkjet image forming apparatus 100, with reference to FIG. 32.

FIG. 32 is a block diagram illustrating a configuration of the inkjet image forming apparatus 100.

As illustrated in FIG. 32, the inkjet image forming apparatus 100 includes a sheet feeding device 110, a sheet conveying device 120, an image forming device 130, a drying device 140, and a sheet output device 150.

The sheet P fed from the sheet feeding device 110 is conveyed by the sheet conveying device 120 to the image forming device 130.

In the image forming device 130, the sheet P is positioned to a cylindrical drum 131. Then, along with rotation of the cylindrical drum 131, the sheet P is conveyed in a direction indicated by arrow in FIG. 32. Consequently, the sheet P is conveyed to a position below ink discharging heads 132 of respective colors (i.e., an image forming position to the sheet P). Then, ink of each color is sprayed onto the sheet P, so that an image is formed on the surface of the sheet P.

The sheet P having the image formed by the image forming device 130 is conveyed to the drying device 140 where moisture in the ink on the surface of the sheet P is evaporated. Thereafter, the sheet P is ejected to a position where the sheet P can be easily picked up by a user.

When the duplex printing is performed to the sheet P, the sheet P after completion of the drying process passes a sheet reversal passage 160 to be further conveyed to the sheet conveying device 120 while the sheet P is reversed with the front face down.

By applying the above-described configuration of the sheet conveying device 30 according to this disclosure to the sheet conveying device 120, the sheet conveying device 120 can achieve the same effect as the above-described sheet conveying device 30. Specifically, the sheet P is conveyed to the image forming device 130 and, at the same time, the position of the image formed on the front face of the sheet P and the position of the image formed on the back face of the sheet P can be matched.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image forming apparatus comprising:
   an image forming device configured to perform an image formation on an image formation surface of a sheet, the image forming device including a transfer device to configured to transfer an image to the image formation surface of the sheet;
   a pair of detectors including an upstream side detector and a downstream side detector disposed downstream from the upstream side detector in a sheet conveying direction, the upstream side detector and the downstream side detector each configured to detect a position of a first image previously formed on a first surface of the sheet through the image formation of the image forming device while a second surface of the sheet is the image formation surface, the upstream side detector and the downstream side detector each being contact image sensors (CISs) oriented to face the first surface of the sheet with the first image previously formed thereon while the second surface of the sheet is the image formation surface;
   a holding body configured to, while holding the sheet such that the second surface of the sheet is the image formation surface with the first surface of the sheet having the first image previously formed thereon, perform one of a rotation in a radial direction about a support shaft attached thereto in a direction perpendicular to an axial direction thereof and a lateral shift in a width direction of the sheet, in response to an instruction; and
   a controller configured to,
      analyze the position of the first image on the first surface of the sheet obtained by the pair of detectors by determining a difference in the position of the first image as detected by the upstream side detector and the position of the first image as detected by the downstream side detector to generate an analysis result, and
      generate the instruction to cause the holding body to perform the one of the rotation and the lateral shift to match a relative position of the first image previously formed on the first surface of the sheet with a second image to be formed on the second surface of the sheet based on the analysis result such that a position that the second image is subsequently formed on the second surface after the one of the rotation and the lateral shift is based the upstream side detector and the downstream side detector each detecting the position of the first image previously formed on the first surface while the second surface of the sheet is the image formation surface.

2. The image forming apparatus according to claim 1, wherein the holding body is configured to move the sheet by performing one of the rotation in the radial direction and the lateral shift in the width direction of the sheet, operable to match the position of the first image formed on the first surface of the sheet with an ideal image forming position having no positional shift of the second image to be formed on the second surface of the sheet.

3. The image forming apparatus according to claim 1,
   wherein an amount of positional deviation of the first image formed on the first surface of the sheet, from an ideal image forming position of the first image on the first surface of the sheet, is referred to as an amount of assumed displacement,
   wherein an image forming position on the second surface of the sheet, displaced by the amount of assumed displacement, from an ideal image forming position of the second image on the second surface of the sheet, is referred to an assumed image forming position on the second surface of the sheet, and
   wherein the holding body is configured to move the sheet by performing one of the rotation in the radial direction and the lateral shift in the width direction, operable to match the first image formed on the first surface of the sheet with the assumed image forming position on the second surface of the sheet.

4. The image forming apparatus according to claim 1,
   wherein the upstream side detector and the downstream side detector are disposed facing the sheet and are configured to detect a lateral position of the sheet in the width direction and an angular position of the sheet to the sheet conveying direction.

5. The image forming apparatus according to claim 4,
   wherein the image forming device is configured to form the image on one side of the sheet, at an image forming position located downstream from the upstream side detector and the downstream side detector in the sheet conveying direction, and
   wherein the upstream side detector and the downstream side detector are disposed facing the other side of the sheet.

6. The image forming apparatus according to claim 1,
   wherein, during an operation of printing the first image on the first surface of the sheet, the holding body is configured to correct a lateral displacement of the sheet on a sheet conveyance passage and an angular displacement of the sheet to the sheet conveying direction.

7. The image forming apparatus according to claim 1,
   wherein the pair of detectors are each configured to detect the position of the image previously formed on the sheet, and
   wherein the holding body is configured to cause the sheet to move by performing one of the rotation in the radial direction and the lateral shift in the width direction of the sheet with a feedback control based on the position of a first image.

8. The image forming apparatus according to claim 1,
   wherein the holding body includes a pair of sheet holding rollers configured to hold and convey the sheet.

9. The image forming apparatus according to claim 1, further comprising:
   a support configured to rotatably support the holding body.

10. The image forming apparatus according to claim 1, the pair of detectors are each configured to detect the position of the sheet as a sheet position in response to the sheet crossing the detector with the first surface of the sheet having the first image previously formed thereon, and to detect the position of the first image previously formed on the first surface of the sheet as an image position in response to the first image crossing the detector.

11. The image forming apparatus according to claim 10, wherein the upstream side detector detects the position of the first image formed on the first surface of the sheet as a first image position in response to the first image crossing the upstream side detector, and the downstream side detector detects the position of the first image formed on the first surface of the sheet as a second image position in response to the first image crossing the downstream side detector.

12. The image forming apparatus according to claim 11, wherein the controller is configured to,
   calculate a first distance from a side end of the sheet to the first image based on the first image position and a second distance from the side end of the sheet to the first image based on the second image position,
   calculate a lateral displacement of the first image based on the first distance and the second distance, and
   cause the holding body to correct the position of the sheet based on the lateral displacement of the first image.

13. The image forming apparatus according to claim 12, wherein the controller is further configured to,
   calculate a slope of the first image based on the first distance, the second distance and a third distance between the upstream side detector and the downstream side detector, and
   cause the holding body to correct the position of the sheet based on the lateral displacement of the first image and the slope of the first image.

14. The image forming apparatus according to claim 1, wherein the upstream side detector and the downstream side detector are each configured to (i) detect the position of the sheet in the width direction of the sheet, (ii) an angular displacement of the sheet, relative the sheet conveyance direction, and (iii) an angular displacement of the first image, formed on the sheet, relative to the sheet conveyance direction.

15. The image forming apparatus according to claim 1, wherein the first image is a test image.

16. The image forming apparatus according to claim 1, wherein the upstream side detector and the downstream side detector are each configured to detect the position of the first image previously formed on the first surface of the sheet through the image formation of the image forming device by distinguishing a boundary of the first image from a background color of the first surface of the sheet.

17. The image forming apparatus according to claim 1, further comprising:
   an intermediate transfer belt.

18. The image forming apparatus according to claim 1, further comprising:
   an intermediate transfer belt; and
   a pair of detectors disposed below the intermediate transfer belt.

19. The image forming apparatus according to claim 1, further comprising:
   an intermediate transfer belt; and
   a pair of detectors disposed below a tilted portion of the intermediate transfer belt.

* * * * *